United States Patent
Hahn et al.

(10) Patent No.: US 12,413,284 B2
(45) Date of Patent: Sep. 9, 2025

(54) METHOD AND APPARATUS FOR TRANSMITTING AND RECEIVING SIGNAL IN COMMUNICATION SYSTEM

(71) Applicants: HYUNDAI MOTOR COMPANY, Seoul (KR); KIA CORPORATION, Seoul (KR); SEOUL NATIONAL UNIVERSITY R&DB FOUNDATION, Seoul (KR)

(72) Inventors: Gene Back Hahn, Hwaseong-si (KR); Young Kil Suh, Hwaseong-si (KR); Ui Hyun Hong, Hwaseong-si (KR); Bum Jun Kim, Seoul (KR); Jeonghyeon Kwon, Seoul (KR); Wan Choi, Seoul (KR)

(73) Assignees: Hyundai Motor Company, Seoul (KR); Kia Corporation, Seoul (KR); Seoul National University R & DB Foundation, Seoul (KR)

( * ) Notice: Subject to any disclaimer, the term of this patent is extended or adjusted under 35 U.S.C. 154(b) by 0 days.

(21) Appl. No.: 18/740,267

(22) Filed: Jun. 11, 2024

(65) Prior Publication Data

US 2024/0348309 A1    Oct. 17, 2024

Related U.S. Application Data

(63) Continuation-in-part of application No. PCT/KR2022/021009, filed on Dec. 21, 2022.

(30) Foreign Application Priority Data

Dec. 21, 2021  (KR) .................. 10-2021-0183552

(51) Int. Cl.
*H04L 5/12* (2006.01)
*H01Q 15/02* (2006.01)
(Continued)

(52) U.S. Cl.
CPC ........... *H04B 7/0691* (2013.01); *H01Q 15/02* (2013.01); *H04B 7/0874* (2013.01)

(58) Field of Classification Search
CPC ..... H04B 7/0691; H04B 7/0874; H01Q 15/02
USPC ............... 375/262, 260, 259, 219, 295, 316
See application file for complete search history.

(56) References Cited

U.S. PATENT DOCUMENTS

| | | |
|---|---|---|
| 2015/0171946 A1 | 6/2015 | Hosoya et al. |
| 2019/0181926 A1 | 6/2019 | Liang et al. |

(Continued)

FOREIGN PATENT DOCUMENTS

WO    2000/67398 A1    11/2000

OTHER PUBLICATIONS

International Search Report dated Apr. 3, 2023 cited in International Patent Application No. PCT/KR2022/021009 (w/ English translation).

(Continued)

*Primary Examiner* — Zewdu A Kassa
(74) *Attorney, Agent, or Firm* — Morgan Lewis & Bockius LLP

(57) ABSTRACT

A method for operation of a first communication node in an embodiment of a communication system may include the steps of: from among a plurality of transmission antenna elements constituting a first transmission antenna of the first communication node, determining a transmission candidate antenna group including one or more transmission antenna elements via which a wireless signal may be transmitted in the direction of a second communication node through a first lens; receiving information regarding a reception candidate antenna group from the second communication node; determining one or more antenna element combinations on the basis of the one or more transmission antenna elements included in the transmission candidate antenna group and (Continued)

one or more reception antenna elements included in the reception candidate antenna group; and performing, on the basis of the one or more antenna element combinations, wireless communication with the second communication node.

20 Claims, 10 Drawing Sheets

(51) Int. Cl.
    *H04B 7/06*     (2006.01)
    *H04B 7/08*     (2006.01)

(56) References Cited

U.S. PATENT DOCUMENTS

| | | |
|---|---|---|
| 2021/0066798 A1* | 3/2021 | Kwak .................. H01Q 19/062 |
| 2021/0344393 A1 | 11/2021 | Dai et al. |
| 2021/0376461 A1 | 12/2021 | Dallal et al. |

OTHER PUBLICATIONS

3rd Generation Partnership Project; Technical Specification Group Radio Access Network; NR; Physical channels and modulation (Release 16), 3GPP TS 38.211 V16.7.0 (Sep. 2021).

3rd Generation Partnership Project; Technical Specification Group Radio Access Network; NR; Physical layer procedures for data (Release 16), 3GPP TS 38.214 V16.7.0 (Sep. 2021).

* cited by examiner

METHOD AND APPARATUS FOR TRANSMITTING AND RECEIVING SIGNAL IN COMMUNICATION SYSTEM

CROSS-REFERENCE TO RELATED APPLICATION

The present application is a continuation-in-part of currently pending International Patent Application No. PCT/KR2022/021009, filed Dec. 21, 2022, which claims priority to Korean Patent Application Number 2021-0183552, filed Dec. 21, 2021, the entire contents of which are incorporated herein for all purposes by these references.

BACKGROUND OF THE INVENTION

Field of the Present Disclosure

The present disclosure relates to a signal transmission and reception technique is a communication system, and more particularly, to a signal transmission and reception technique for improving multi-input multi-output (MIMO)-based beam transmission and reception performance in a high frequency band.

Description of Related Art

With the development of information and communication technology, various wireless communication technologies are being developed. Representative wireless communication technologies include long-term evolution (LTE) and new radio (NR) defined as the 3rd generation partnership project (3GPP) standards. The LTE may be one of the 4th generation (4G) wireless communication technologies, and the NR may be one of the 5th generation (5G) wireless communication technologies.

In order to process rapidly increasing wireless data, the 5G NR communication or subsequent wireless communication technologies can support communication in relatively high frequency bands. For example, radio frequency bands used for wireless communication may be broadly classified into frequency range 1 (FR1) bands and frequency range 2 (FR2) bands. Here, the FR1 bands may refer to relatively low frequency bands of about 7 GHz or below. The FR2 bands may refer to relatively high frequency bands of about 7 GHz or above.

In a relatively high frequency band such as a 24-53 GHz band corresponding to the FR2 band, an unlicensed band, and a millimeter wave band, a path loss may occur at a relatively high level. In an exemplary embodiment of a communication system using a high frequency band, the path loss problem may be solved by using a large number of antennas to transmit and receive a wireless signal (or beam) with high antenna gain.

In an ultra-high frequency band such as a terahertz wave band, a very large number of antennas may need to be used to improve communication quality. As the number of antennas used for communication increases, the overhead and/or the amount of calculation required for communication may increase. Techniques for improving efficiency in performing beam-based communication using a large number of antennas may be required in a relatively high frequency band.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present disclosure are directed to providing a signal transmission and reception method and apparatus for improving MIMO-based beam transmission and reception performance, in which radio signals are transmitted and received using a large number of antennas in a high frequency band.

An operation method of a first communication node, according to an exemplary embodiment of the present disclosure for achieving the above-described objective, may include: determining a first lens to be applied to a first transmission antenna of the first communication node; identifying a first transmission direction for a second communication node of the communication system; determining a transmission candidate antenna group that includes one or more transmission antenna elements capable of transmitting a wireless signal in the first transmission direction through the first lens among a plurality of transmission antenna elements constituting the first transmission antenna; receiving information on a reception candidate antenna group from the second communication node; determining one or more antenna element combinations based on the one or more transmission antenna elements included in the transmission candidate antenna group and one or more reception antenna elements included in the reception candidate antenna group; and performing wireless communication with the second communication node based on the one or more antenna element combinations.

The one or more transmission antenna elements included in the transmission candidate antenna group may be selected based on a first transmission antenna element corresponding to a first angle of departure determined based on the first transmission direction and the first lens.

The first transmission direction may be identified based on location information for the first communication node, and the one or more reception antenna elements included in the reception candidate antenna group may be selected based on a first reception antenna element determined based on a first reception direction for the first communication node identified at the second communication node and a first angle of incidence determined according to a second lens applied to a first reception antenna of the second communication node.

Each of the one or more antenna element combinations may include at least one transmission antenna element corresponding to a number of simultaneously available transmission antenna elements of the first communication node among the one or more transmission antenna elements included in the transmission candidate antenna group, and at least one reception antenna element corresponding to a number of simultaneously available reception antenna elements of the second communication node among the one or more reception antenna elements included in the reception candidate antenna group.

The performing of wireless communication with the second communication node may include: transmitting, to the second communication node, information on the one or more antenna element combinations, wherein the information on the one or more antenna element combinations may indicate a combination index corresponding to each of the one or more antenna element combinations, and a mapping relationship between at least one transmission antenna element and at least one reception antenna element.

The performing of wireless communication with the second communication node may include: transmitting, to the second communication node, information on the one or more antenna element combinations; performing, with the second communication node, a first measurement procedure based on the information on the one or more antenna element combinations; identifying a reception strength corresponding to each of the one or more antenna element combinations, based on the first measurement procedure; and determining a priority of each of the one or more antenna element combinations based on the reception strength corresponding to each of the one or more antenna element combinations.

The performing of wireless communication with the second communication node may include: receiving, from the second communication node, a reselection indicator indicating whether a reselection procedure for the one or more antenna element combinations is required, wherein when the reselection indicator indicates that the reselection procedure is required, the reselection procedure may be triggered.

The determining of the first lens may include: identifying information on a first reference frequency for determining a lens to be applied to the first transmission antenna; and determining the first lens based on the information on the first reference frequency and information on a first frequency to be used for communication with the second communication node.

The operation method may further include: before receiving the information on the reception candidate antenna group, transmitting, to the second communication node, a first indication including information on a second reference frequency for determining a lens to be applied to a first reception antenna of the second communication node; and transmitting first scheduling information including information on a first frequency to be used for communication with the second communication node, wherein the information on the second reference frequency and the information on the first frequency may be used to determine a second lens to be applied to the first reception antenna in the second communication node.

An operation method of a first communication node, according to an exemplary embodiment of the present disclosure for achieving the above-described objective, may include: determining a first lens to be applied to a first reception antenna of the first communication node; identifying a first reception direction for a second communication node of the communication system; determining a reception candidate antenna group that includes one or more reception antenna elements capable of receiving a wireless signal received at the first reception antenna in the first reception direction through the first lens among a plurality of reception antenna elements constituting the first reception antenna; transmitting information on the reception candidate antenna group to the second communication node; receiving, from the second communication node, information on one or more antenna element combinations determined based on the one or more reception antenna elements included in the reception candidate antenna group and one or more transmission antenna elements included in a transmission candidate antenna group determined by the second communication node; and performing wireless communication with the second communication node based on the one or more antenna element combinations.

The one or more transmission antenna elements included in the transmission candidate antenna group may be selected based on a first transmission antenna element corresponding to a first angle of departure determined based on a first transmission direction for the first communication node identified at the second communication node and a second lens to be applied to a first transmission antenna of the first communication node.

The one or more reception antenna elements included in the reception candidate antenna group may be selected based on a first reception antenna element corresponding to a first angle of incidence determined based on the first reception direction and the first lens.

Each of the one or more antenna element combinations may include at least one transmission antenna element corresponding to a number of simultaneously available transmission antenna elements of the second communication node among the one or more transmission antenna elements included in the transmission candidate antenna group, and at least one reception antenna element corresponding to a number of simultaneously available reception antenna elements of the first communication node among the one or more reception antenna elements included in the reception candidate antenna group.

The performing of wireless communication with the second communication node may include: performing, with the second communication node, a first measurement procedure based on information on the one or more antenna element combinations; identifying a reception strength corresponding to each of the one or more antenna element combinations, based on the first measurement procedure; and transmitting, to the second communication node, information on the reception strength corresponding to each of the one or more antenna element combinations.

The performing of wireless communication with the second communication node may include: transmitting, to the second communication node, a reselection indicator indicating whether a reselection procedure for the one or more antenna element combinations is required, wherein when the reselection indicator indicates that the reselection procedure is required, the reselection procedure may be triggered.

The transmitting of the reselection indicator may include: identifying a reception strength corresponding to each of the one or more antenna element combinations; performing determination on whether the reselection procedure is required based on the reception strength corresponding to each of the one or more antenna element combinations; generating the reselection indicator based on a result of the determination on whether the reselection procedure is required; and transmitting the generated reselection indicator to the second communication node.

A transmitting node, according to an exemplary embodiment of the present disclosure for achieving the above-described objective, may include a processor, and the processor may cause the transmitting node to perform: determining a first lens to be applied to a first transmission antenna of the transmitting node; identifying transmission directions for a plurality of receiving nodes of the communication system, respectively; determining a transmission candidate antenna group that includes one or more transmission antenna elements capable of transmitting wireless signals in the transmission directions through the first lens among a plurality of transmission antenna elements constituting the first transmission antenna; receiving information on reception candidate antenna groups from the plurality of receiving nodes; determining one or more antenna element combinations based on the one or more transmission antenna elements included in the transmission candidate antenna group and one or more reception antenna elements included in the reception candidate antenna group; and performing wireless communication with the receiving nodes based on the one or more antenna element combinations.

Each of the one or more antenna element combinations may include at least one transmission antenna element corresponding to a number of simultaneously available transmission antenna elements of the transmitting node among the one or more transmission antenna elements included in the transmission candidate antenna group, and at least one reception antenna element corresponding to a number of simultaneously available reception antenna elements of the receiving nodes among the one or more reception antenna elements included in the reception candidate antenna group.

In the performing of the wireless communication with the receiving nodes, the processor may further cause the transmitting node to perform: transmitting, to the receiving nodes, information on the one or more antenna element combinations; performing, with the receiving nodes, a first measurement procedure based on the information on the one or more antenna element combinations; identifying reception strengths respectively corresponding to the one or more antenna element combinations, based on the first measurement procedure; and determining respective priorities of the one or more antenna element combinations based on the reception strengths respectively corresponding to the one or more antenna element combinations.

In the determining of the first lens, the processor may further cause the transmitting node to perform: identifying Doppler shift (DS) information and latency requirement (LR) information for each of the receiving nodes; and determining the respective priorities of the one or more antenna element combinations based on the reception strengths respectively corresponding to the one or more antenna element combinations, the DS information for each of the receiving nodes, and the LR information for each of the receiving nodes.

According to the method and apparatus for transmitting and receiving signals in the communication system, MIMO-based beam transmission and reception performance for transmitting and receiving wireless signals using a large number of antennas in a high-frequency band can be improved. In the communication system, a transmitting node and a receiving node that transmit and receive wireless signals using a lens MIMO structured antenna can determine a transmission candidate antenna group and a reception candidate antenna group based on the results of mutual wireless signal transmission and reception. The transmitting node and the receiving node can determine one or more antenna element combinations based on the transmission and reception candidate antenna groups and can perform wireless communication with each other based on the determined antenna element combinations. Accordingly, the transmitting node and the receiving node can determine optimal transmission and reception directions for mutual communication.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
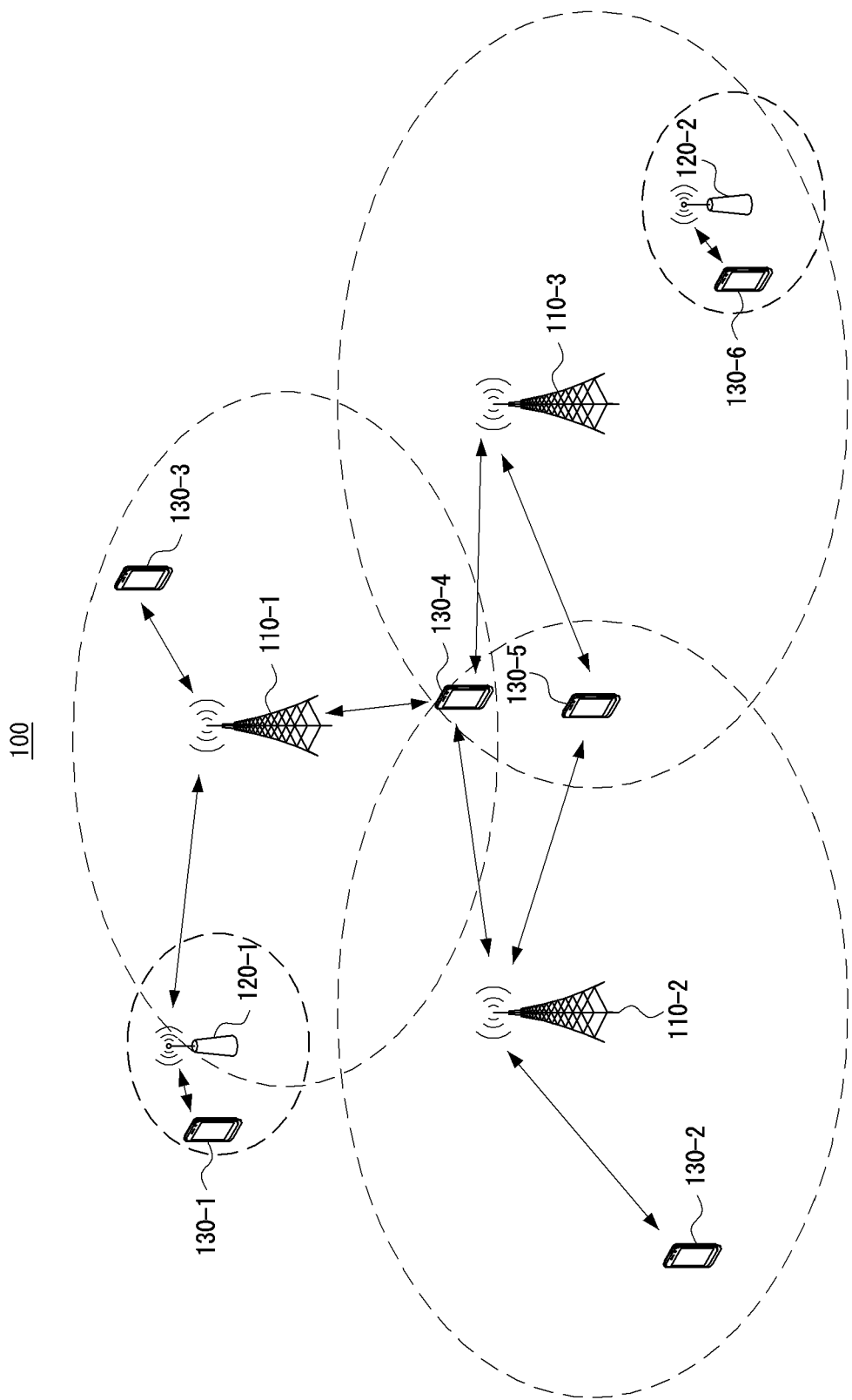
FIG. 1 is a conceptual diagram illustrating an exemplary embodiment of a communication system.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present disclosure, it will be understood that the present description is not intended to limit the invention(s) to those exemplary embodiments. On the contrary, the invention(s) is/are intended to cover not only the exemplary embodiments of the present disclosure, but also various alternatives, modifications, equivalents and other embodiments, which may be included within the spirit and scope of the invention as defined by the appended claims.

While the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a Global System for Mobile communication (GSM) or a Code Division Multiple Access (CDMA), 3G mobile communication network such as a Wideband Code Division Multiple Access (WCDMA) or a CDMA2000, 3.5G mobile communication network such as a High Speed Downlink Packet Access (HSDPA) or a High Speed Uplink Packet Access (HSUPA), 4G mobile communication network such as a Long Term Evolution (LTE) network or an LTE- Advanced network, 5G mobile communication network, B5G mobile communication network (6G communication network, etc.), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g. a serving gateway (S-GW), a packet data network (PDN) gateway (P-GW), and a mobility management entity (MME)). When the communication system 100 is a 5G communication system (e.g. New Radio (NR) system), the core network may include an access and mobility management function (AMF), a user plane function (UPF), a session management function (SMF), and the like.

The plurality of communication nodes 110-1, 110-2, 110-3, 120-1, 120-2, 130-1, 130-2, 130-3, 130-4, 130-5, and 130-6 may support communication protocols defined in the 3rd generation partnership project (3GPP) technical specifications (e.g. LTE communication protocol, LTE-A communication protocol, NR communication protocol, or the like). The plurality of communication nodes 110-1, 110-2, 110-3, 120-1, 120-2, 130-1, 130-2, 130-3, 130-4, 130-5, and 130-6 may support code division multiple Code Division Multiple Access (CDMA) based communication protocol, Wideband CDMA (WCDMA) based communication protocol, Time Division Multiple Access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
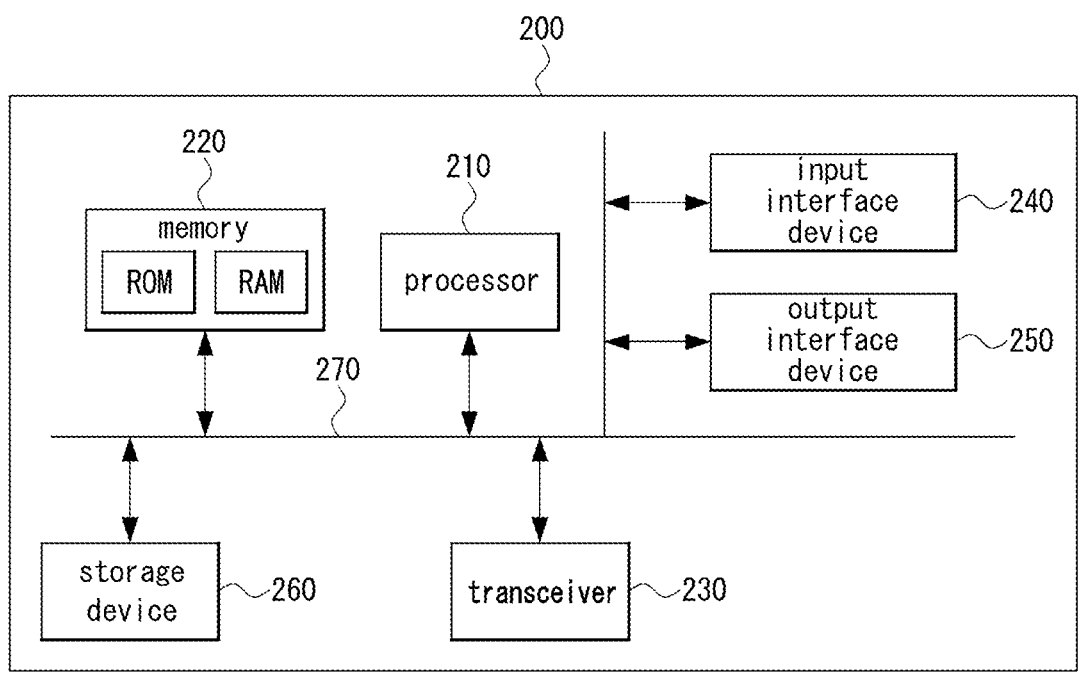
FIG. 2 is a block diagram illustrating an exemplary embodiment of a communication node constituting a communication system.

FIG. 2 is a block diagram illustrating an exemplary embodiment of a communication node constituting a communication system.

As shown in FIG. 2, an apparatus 200 may include at least one processor 210, a memory 220, and a transceiver 230 connected to the network for performing communications. Also, the apparatus 200 may further include an input interface device 240, an output interface device 250, a storage device 260, and the like. The respective components included in the apparatus 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may include at least one of read-only memory (ROM) and random access memory (RAM).

Referring again to FIG. 1, the communication system 100 may include a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g. single-user MIMO (SU-MIMO), multi-user MIMO (MU-MIMO), massive MIMO, or the like), a coordinated multipoint (COMP) transmission, a carrier aggregation (CA) transmission, a transmission in unlicensed band, a device-to-device (D2D) communication (or, proximity services (ProSc)), an Internet of Things (IoT) communication, a dual connectivity (DC), or the like. Here, each of the plurality of terminals 130-1, 130-2, 130-3, 130-4, 130-5, and 130-6 may perform operations corresponding to operations of the plurality of base stations 110-1, 110-2, 110-3, 120-1, and 120-2, operations supported by the plurality of base stations 110-1, 110-2, 110-3, 120-1, and 120-2, or the like. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, signal transmission and reception methods in a communication system will be described. Even when a method (e.g. transmission or reception of a data packet) performed at a first communication node among communication nodes is described, the corresponding second communication node may perform a method (e.g. reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Figure 3:
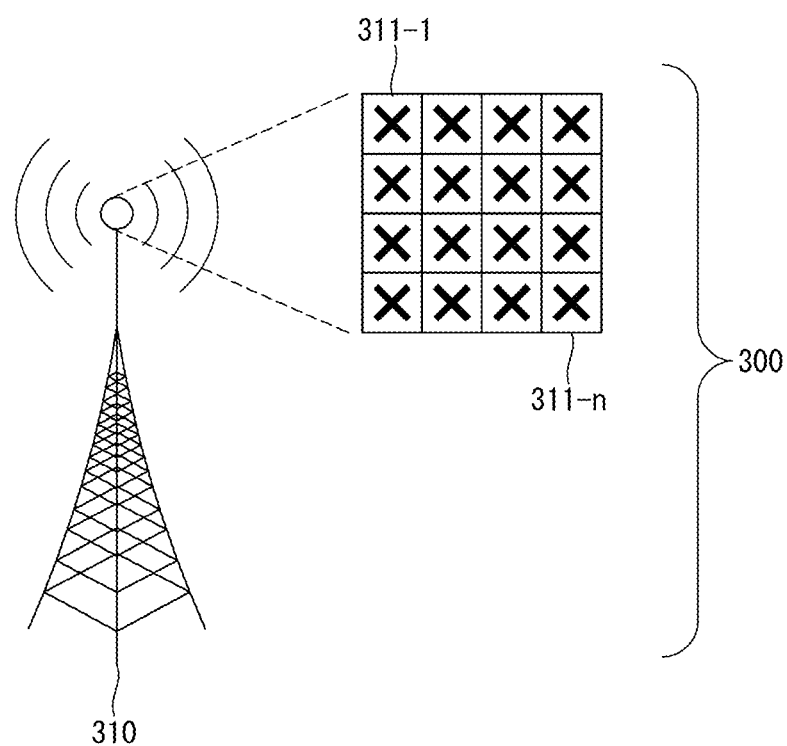
FIG. 3 is a conceptual diagram for describing various exemplary embodiments of an antenna configuration in a communication system.

FIG. 3 is a conceptual diagram for describing a first exemplary embodiment of an antenna configuration in a communication system.

As shown in FIG. 3, a communication system 300 may support multi-input multi-output (MIMO)-based communication. The communication system 300 may include one or more communication nodes that transmit and/or receive wireless signals. The one or more communication nodes included in the communication system 300 may be the same as or similar to the plurality of base stations 110-1, 110-2, 110-3, 120-1, and 120-2, and the plurality of terminals 130-1, 130-2, 130-3, 130-4, 130-5, and 130-6 described with reference to FIG. 1. Each of the one or more communication nodes included in the communication system 300 may be the same as or similar to the communication node 200 described with reference to FIG. 2. Each of the one or more communication nodes included in the communication system 300 may include one or more antennas capable of transmitting and/or receiving wireless signals based on MIMO.

In order to process rapidly increasing wireless data, the 5G NR communication or subsequent wireless communication technologies can support communication in relatively high frequency bands. For example, radio frequency bands used for wireless communication may be broadly classified into frequency range 1 (FR1) bands and frequency range 2 (FR2) bands. Here, the FR1 bands may refer to relatively low frequency bands of about 7 GHz or below. The FR2 bands may refer to relatively high frequency bands of about 7 GHz or above.

In a relatively high frequency band such as a 24-53 GHz band corresponding to the FR2 band, an unlicensed band, and a millimeter wave band, a path loss may occur at a relatively high level. In an exemplary embodiment of a communication system using a high frequency band, the path loss problem may be solved by using a large number of antennas to transmit and receive a wireless signal (or beam) with high antenna gain.

For example, the communication system 300 may include a first antenna 310. The first antenna 310 may support MIMO. The first antenna 310 may be composed of n antenna elements 311-1, . . . , and 311-n (n is a natural number). The n antenna elements 311-1, . . . , and 311-n constituting the first antenna 310 may be arranged regularly or irregularly.

In an exemplary embodiment of the communication system 300, the first antenna 310 may have a uniform linear array (ULA) structure. In the first antenna 310 having the ULA structure, the antenna elements 311-1, . . . , and 311-n may be arranged in a row at regular intervals.

Meanwhile, in another exemplary embodiment of the communication system 300, the first antenna 310 may have a uniform planar array (UPA) structure. In the first antenna 310 having the UPA structure, the antenna elements 311-1, . . . , and 311-n may be arranged in a grid structure on a plane at regular intervals.

In an exemplary embodiment of the communication system, antenna ports and/or antenna panel(s) may be defined to improve operational efficiency for the antenna supporting MIMO. For example, the first antenna 310 may be composed of one or more antenna ports each composed of one or more antenna elements having the same channel. The first antenna 310 may have a single-panel antenna structure or a multi-panel antenna structure.

In an exemplary embodiment of the communication system, an antenna port may be configured as a basic unit of the antenna structure. An antenna port may be defined as one logical antenna composed of one or more antenna elements (or antennas) having the same channel. A channel of a specific symbol transmitted from one antenna port may be inferred from a channel of another symbol transmitted from the same antenna port.

For example, a channel through which a physical downlink shared channel (PDSCH) symbol of one antenna port is transmitted may be inferred from a channel through which a demodulation-reference (DM-RS) symbol associated with the PDSCH symbol is transmitted from the same antenna port. A channel through which a physical downlink control channel (PDCCH) symbol of one antenna port is transmitted may be inferred from a channel through which a DM-RS associated with the PDCCH symbol is transmitted from the same antenna port. A channel through which a physical broadcast channel (PBCH) symbol of one antenna port is transmitted may be inferred from a channel through which a DM-RS associated with the PBCH symbol is transmitted from the same antenna port.

If large-scale characteristics of a channel through which a symbol is transmitted from one antenna port can be estimated or inferred from a channel through which a symbol of another antenna port is transmitted, the two different antenna ports may be expressed as being quasi-co-located (QCLed). Here, the large-scale characteristics of the channel may include one or more of 'delay spread', 'Doppler spread', 'Doppler shift', 'average gain', 'average delay', or 'spatial Rx parameters'.

A structure in which all of one or more antenna elements (or antennas) constituting one antenna structure exist on one panel may be referred to as a 'single-panel antenna structure'. On the other hand, a structure in which a plurality of antenna elements (or antennas) constituting one antenna structure exist as being divided on a plurality of panels may be referred to as a 'multi-panel antenna structure'. The multi-panel antenna structure may have advantages such as high power gain and low computational complexity.

In an ultra-high frequency band such as a terahertz wave band, a very large number of antennas may need to be used to improve communication quality. As the number of antennas used for communication increases, the overhead and/or the amount of calculation required for communication may increase. Techniques for improving efficiency in transmitting and receiving wireless signals using a large number of antennas may be required in a relatively high frequency band.

Figure 4:
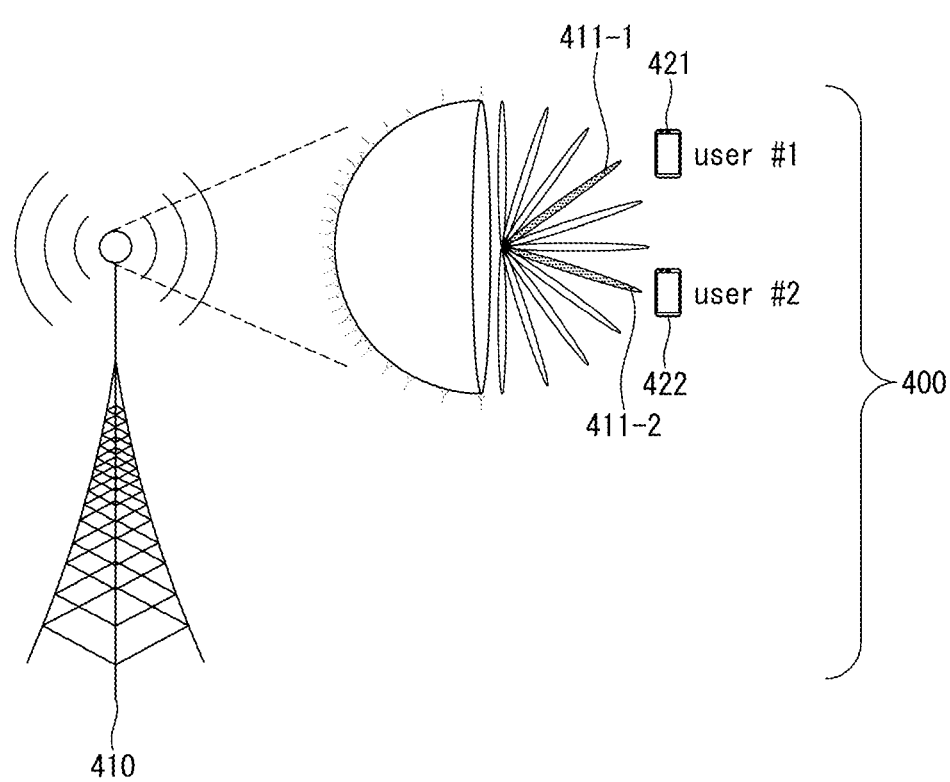
FIG. 4 is a conceptual diagram for describing various exemplary embodiments of an antenna configuration in a communication system.

FIG. 4 is a conceptual diagram for describing a second exemplary embodiment of an antenna configuration in a communication system.

As shown in FIG. 4, a communication system 400 may support MIMO-based communication. The communication system 400 may include one or more communication nodes that transmit and/or receive wireless signals. Each of the one or more communication nodes included in the communication system 400 may include one or more antennas capable of transmitting and/or receiving wireless signals based on MIMO. Hereinafter, in describing the second exemplary embodiment of the antenna configuration in the communication system with reference to FIG. 4, descriptions that are redundant with those described with reference to FIGS. 1 to 3 may be omitted.

The communication system 400 may support communication in an ultra-high frequency band, such as a terahertz wave band. In an ultra-high frequency band such as a terahertz wave band, a very large number of antennas may need to be used to improve communication quality. Meanwhile, in a ultra-high frequency band such as a terahertz wave band, line-of-sight (LoS) components may dominate a received wireless signal, and non-LoS (NLoS) components may hardly exist in the receive wireless signal. The communication system 400 may include one or more antennas configured to easily support communication in an ultra-high frequency band, such as a terahertz wave band.

The communication system 400 may include a first communication node. The first communication node may include a first antenna 410. The first antenna 410 may support MIMO. The first antenna 410 may be composed of a plurality of antenna elements. The plurality of antenna elements constituting the first antenna 410 may be arranged regularly or irregularly. In an exemplary embodiment of the communication system 400, the first antenna 410 may have a structure in which a plurality of antenna elements are arranged at predetermined intervals.

In an antenna structure in which a plurality of antenna elements are arranged at regular intervals, such as the ULA structure or UPA structure, communication quality may be affected by a relationship between a spacing between the antenna elements and a wavelength of a wireless signal. In the antenna structure in which the plurality of antenna elements are arranged at regular intervals, an appropriate distance between antenna elements may be determined differently depending on a frequency, reference frequency, or carrier offset of a transmitted and received wireless signal.

In an ultra-high frequency band such as a terahertz wave band, a range of used frequencies may be relatively wide. For example, the terahertz wave band may be defined as a 0.1 to 10 THz band. In other words, even within a terahertz wave band, a range of used frequencies may vary by up to 100 times. Expressed differently, even within a terahertz wave band, a range of wavelengths of used wireless signals may vary by up to 100 times. That is, in an ultra-high frequency band such as a terahertz wave band, it may not be easy to respond to a change in allocated or used frequency resources unless a spacing between antenna elements constituting the antenna structure changes.

In an exemplary embodiment of the communication system 400, the first antenna 410 may have a 'lens MIMO' structure. The first antenna 410 may have the structure in which a plurality of antenna elements are arranged at regular intervals (hereinafter, 'antenna element spacing'). The first antenna 410 may further include one or more lenses capable of refracting radiated wireless signals and/or incident wireless signals. The lenses included in the first antenna 410 may be optical lenses capable of physically refracting light. Each of the lenses included in the first antenna 410 may be an electromagnetic wave (EM) lens capable of refracting electromagnetic waves (EM waves) through interaction with electromagnetic or electric fields.

In the first antenna 410 including one or more lenses, a received wireless signal may be incident as being refracted by at least one of the one or more lenses. Accordingly, in the first antenna 410, a frequency of the wireless signal incident on each antenna element may be adjusted to match the antenna element spacing of the first antenna 410. Alternatively, in the first antenna 410 including one or more lenses, a transmitted wireless signal may be radiated as being refracted by at least one of the one or more lenses. Accordingly, in the first antenna 410, a frequency of the wireless signal radiated from each antenna element may be radiated as being adjusted to match the antenna element spacing of the first antenna 410. As the lens (or the size of the lens) is variably applied in the antenna of the lens MIMO scheme according to a change in the frequency band, the communication node may receive or transmit the wireless signal in a manner appropriate for the frequency band without changing physical locations or arrangement of the antenna elements.

In an exemplary embodiment of the communication system 400, a first wireless signal received from a user #1 421 through a first receiving beam 411-1 may be incident on antenna elements of the first antenna 410 by being refracted by a first lens. A second wireless signal received from a user #2 422 through a second receiving beam 411-2 may be incident on antenna elements of the first antenna 410 by being refracted by a second lens.

In the first antenna 410, a lens for refracting the received signal may be used adaptively to a frequency of the received signal, reference frequency, and/or antenna element spacing. In the first antenna 410, a lens for refracting a transmission signal may be used adaptively to a frequency of the transmission signal, reference frequency, and/or antenna element spacing. For example, in an exemplary embodiment of the communication system 400, a mapping relationship that is the same as or similar to Table 1 may be established.

TABLE 1

| Reference frequency | Frequency (THz) | Reference lens |
|---|---|---|
| $F_{REF}$ #1 | A | Lens #1 |
| $F_{REF}$ #2 | B | Lens #2 |
| $F_{REF}$ #3 | C | Lens #3 |
| $F_{REF}$ #4 | D | Lens #4 |

Referring to Table 1, frequencies of wireless signals received by the first antenna 410 in the communication system 400 may be set based on one or more preset reference frequencies. For example, in the communication system 400, four reference frequencies may be set for wireless signal transmission and reception between one or more communication nodes. The four reference frequencies may correspond to $F_{REF}$ #1 (A THz), $F_{REF}$ #2 (B THz), $F_{REF}$ #3 (C THz), and $F_{REF}$ #4 (D THz).

The identifiers of the lenses may be expressed as in Table 1, or may be expressed as decimal values (i.e. 0, 1, 2, 3) or 2-bit binary values (i.e. 00, 01, 10, 11). A unit of a frequency value and a divided frequency band may be THz. In Table 1, a relationship of 'A<B<C<D' may be stablished. However, this is merely an example for convenience of description, and exemplary embodiments of the communication system are not limited thereto.

The four reference frequencies (i.e. $F_{REF}$ #1 to $F_{REF}$ #4) may be references for frequencies of wireless signals transmitted and received between one or more communication nodes. A frequency of each of wireless signals transmitted and received between one or more communication nodes may be set based on one (hereinafter, $F_{REF}$ #n) of the four reference frequencies (i.e. $F_{REF}$ #1 to $F_{REF}$ #4) and a predetermined frequency difference $F_{Diff}$.

In an exemplary embodiment of the communication system 400, each of the four reference frequencies (i.e. $F_{REF}$ #1 to $F_{REF}$ #4) may correspond to the minimum (or lowest) frequency of wireless signals transmitted and received between one or more communication nodes. In the instant case, each of the wireless signals transmitted and received between one or more communication nodes may be configured to have a frequency of $F_{REF}$ #n to ($F_{REF}$ #n+$F_{Diff}$).

In an exemplary embodiment of the communication system 400, each of the four reference frequencies (i.e. $F_{REF}$ #1 to $F_{REF}$ #4) may correspond to the maximum (or highest) frequency of wireless signals transmitted and received between one or more communication nodes. In the instant case, each of the wireless signals transmitted and received between one or more communication nodes may be configured to have a frequency of ($F_{REF}$ #n-$F_{Diff}$) to $F_{REF}$ #n.

In an exemplary embodiment of the communication system 400, each of the four reference frequencies (i.e. $F_{REF}$ #1 to $F_{REF}$ #4) may correspond to a center frequency of wireless signals transmitted and received between one or more communication nodes. In the instant case, each of the wireless signals transmitted and received between one or more communication nodes may be configured to have a frequency of ($F_{REF}$ #n-$F_{Diff}$) to ($F_{REF}$ #n+$F_{Diff}$).

The communication node may transmit or receive a wireless signal using a lens corresponding to a reference frequency corresponding to the transmitted or received wireless signal. For example, when receiving a wireless signal corresponding to $F_{REF}$ #n, the first communication node including the first antenna 410 may receive the wireless signal using a lens #n in the first antenna 410. On the other hand, when transmitting a wireless signal corresponding to $F_{REF}$ #n, the first communication node including the first antenna 410 may transmit the wireless signal using the lens #n in the first antenna 410.

Meanwhile, a frequency of each wireless signal transmitted and received between one or more communication nodes may be set within a frequency band corresponding to one of the four reference frequencies (i.e. $F_{REF}$ #1 to $F_{REF}$ #4). For example, in an exemplary embodiment of the communication system 400, a mapping relationship identical or similar to Table 2 may be established.

TABLE 2

| Reference frequency | Frequency (THz) | Reference frequency band (THz) | Reference lens |
|---|---|---|---|
| $F_{REF}$ #1 | A | A1~A2 | Lens #1 |
| $F_{REF}$ #2 | B | B1~B2 | Lens #2 |
| $F_{REF}$ #3 | C | C1~C2 | Lens #3 |
| $F_{REF}$ #4 | D | D1~D2 | Lens #4 |

The communication node may transmit or receive a wireless signal using a lens corresponding to a frequency band of the transmitted or received wireless signal. For example, when the first communication node including the first antenna 410 receives a wireless signal having a frequency within a frequency band (N1 to N2 THz band) corresponding to the reference frequency $F_{REF}$ #n, the first communication node may receive the wireless signal by using the lens #n in the first antenna 410. On the other hand, when the first communication node including the first antenna 410 transmits a wireless signal having a frequency within the frequency band (N1 to N2 THz) corresponding to the reference frequency $F_{REF}$ #n, the first communication node may transmit the wireless signal by using the lens #n in the first antenna 410.

At least some of the information included in Table 1 or Table 2 (e.g. reference frequency information, reference lens information, etc.) may be transmitted through system information (e.g. system information block (SIB), master information block (MIB), etc.), RRC message (e.g. RRCReconfiguration, etc.), or the like. For example, at least some of the information included in Table 1 or Table 2 (such as reference frequency information, reference lens information, etc.) may be transmitted by the base station to the terminal through system information or RRC message, etc.

The first communication node may receive at least some of information included in Table 1 or Table 2 (such as reference frequency information, reference lens information, etc.) or their mapping relationships from another communication node. For example, when the first communication node is a terminal, the first communication node may identify at least some of the information included in Table 1 or Table 2 and their mapping relationship based on indication information received from the base station. On the other hand, the first communication node may configure at least some of the information included in Table 1 or Table 2 and their mapping relationship on its own. For example, when the first communication node is a base station or a terminal, the first communication node may determine a plurality of lenses (or reference lens information indicating the plurality of lenses) suitable for receiving wireless signals at the respective plurality of reference frequencies, based on information on a wavelength corresponding to each of the plurality of reference frequencies and a spacing between antenna elements constituting the first antenna 410.

Among the factors that determine reference lens information, the size of the lens may be determined based on the number of antenna elements or the spacing between the antenna elements in the antenna having the lens MIMO structure. For example, the total number M of antennas constituting the first antenna 410 (or the maximum value of the number M of antennas) may be expressed as $M=1+\lfloor 2L/\lambda \rfloor$. Here, L may correspond to the size of the lens (e.g. diameter, radius, perimeter, etc.), and λ may correspond to the wavelength of the wireless signal. Since the size of the lens may be inversely proportional to the wavelength, the first communication node may apply a lens that is smaller in size as a larger reference frequency (or frequency band with a larger reference frequency value) is used, thereby enabling communication while maintaining the existing antenna array. For example, in Table 1, when A<B<C<D, it can be seen that the lens #1 has the largest size and the lens #4 has the smallest size among the reference lenses corresponding to the respective frequencies. However, this is merely an example for convenience of description, and in the second exemplary embodiment of the antenna configuration in the communication system, the lens may be determined by adjusting various factors (such as size, refractive index, etc.) for determining the lens according to a change in the frequency band.

In FIG. 4, the antenna elements of the first antenna 410 using a three-dimensional lens are shown as being arranged along a three-dimensional hemisphere, but this is merely an example for convenience of description, and the second exemplary embodiment of the antenna configuration in the communication system is not limited thereto. For example, in an exemplary embodiment of the communication system 400, a two-dimensional or three-dimensional lens may be used in the lens MIMO antenna. In the lens MIMO antenna, antenna elements may be arranged in a two-dimensional or three-dimensional structure. In the lens MIMO antenna, antenna elements may be arranged on a plane, arc, or sphere.

In an exemplary embodiment of the communication system 400, antenna elements arranged in a two-dimensional structure in the lens MIMO antenna may be regarded as corresponding to the ULA structure described with reference to FIG. 3. Antenna elements arranged in a three-dimensional structure in the lens MIMO antenna may be regarded as corresponding to the UPA structure described with reference to FIG. 3.

Figure 5A:
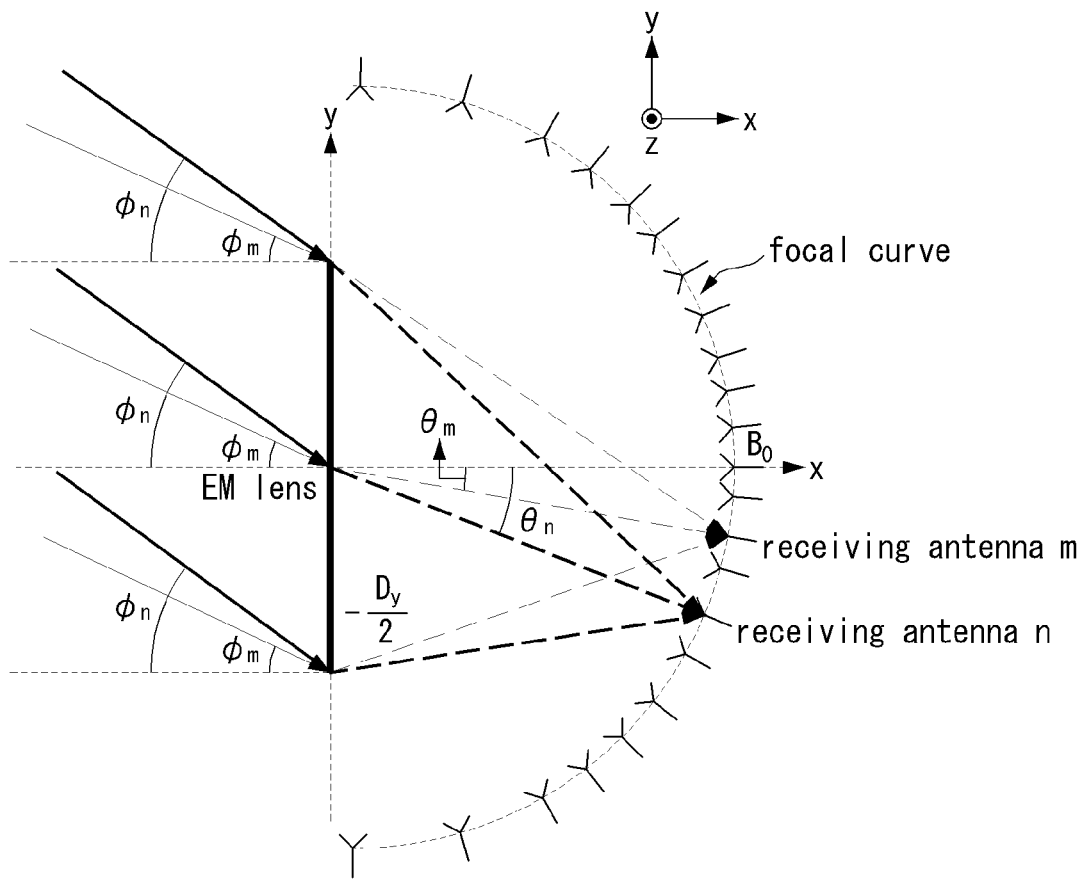
FIG. 5A and FIG. 5B are conceptual diagrams for describing exemplary embodiments of a communication method based on the various exemplary embodiments of the antenna configuration in a communication system.
Figure 5B:
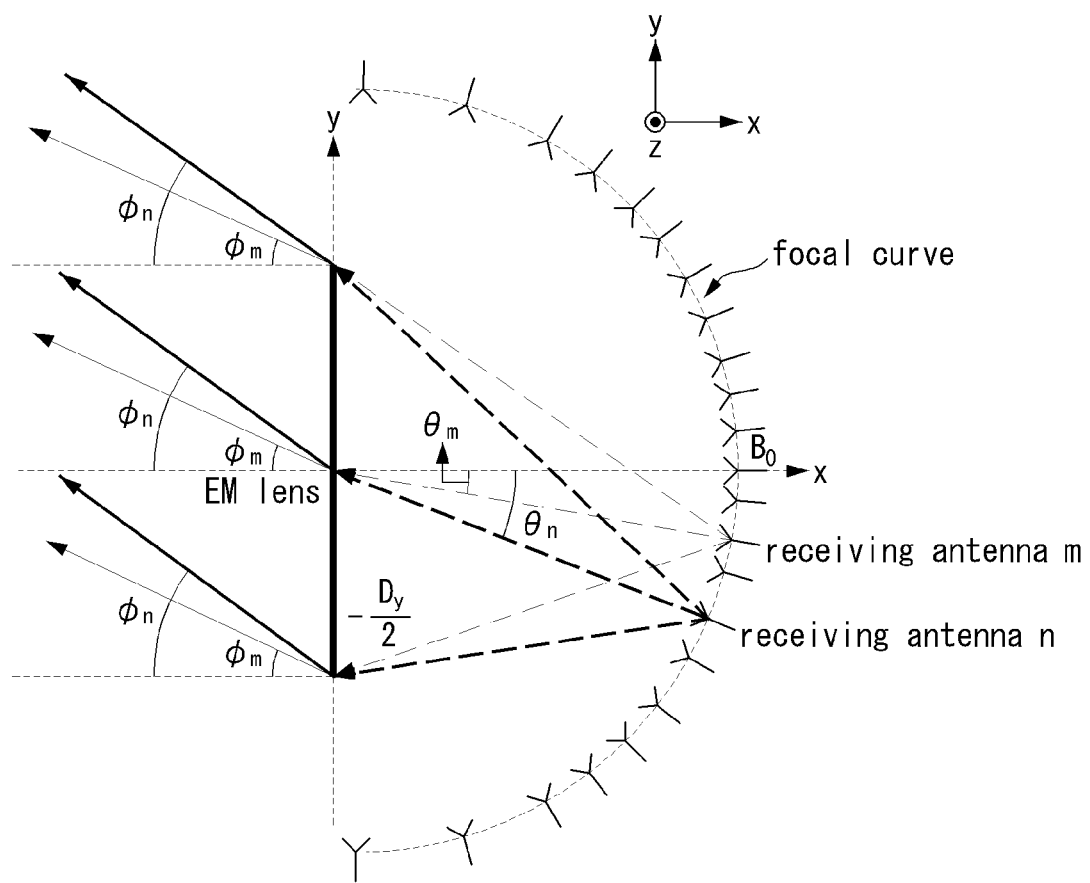

FIGS. 5A and 5B are conceptual diagrams for describing exemplary embodiments of a communication method based on the second exemplary embodiment of the antenna configuration in a communication system.

As shown in FIGS. 5A and 5B, a communication system may support MIMO-based communication. The communication system may include one or more communication nodes that transmit and/or receive wireless signals. Each of the one or more communication nodes included in the communication system may include one or more antennas capable of transmitting and/or receiving wireless signals based on MIMO. Each of the one or more communication nodes included in the communication system may include one or more antennas that are the same as or similar to the first antenna 410 described with reference to FIG. 4. Hereinafter, in describing exemplary embodiments of a communication method based on the second exemplary embodiment of the antenna structure in the communication system with reference to FIGS. 5A and 5B, descriptions that are redundant with those described with reference to FIGS. 1 to 4 may be omitted.

As shown in FIG. 5A, a first communication node may include a first antenna for receiving and/or transmitting wireless signals. The first antenna may be the same as or similar to the first antenna 410 described with reference to FIG. 4. The first antenna may be configured to have a lens MIMO structure. The first antenna may include one or more lenses that refract the transmitted or received wireless signal.

Antenna responses detected or measured by a plurality of antenna elements constituting the first antenna may have the same or similar pattern as a sinc function. The sinc function may be defined identically or similarly to Equation 1.

$$\operatorname{sinc} x = \frac{\sin kx}{kx} \quad \text{[Equation 1]}$$

In Equation 1, k may be a real number such as 1 or pi. An antenna closer to a location corresponding to a main lobe (i.e. median) of the sinc function may have a larger antenna response, and an antenna farther from the location corresponding to the main lobe may have a smaller antenna response. The location of the main lobe of the sinc function with respect to the antenna response may be determined according to an AoA of a received signal. A receiving node may estimate the AoA of the received signal by identifying an antenna element (or its index) corresponding to the location of the main lobe, as shown in FIG. 5A. For example, the first communication node may estimate the AoA of the received signal by sequentially activating a plurality of antenna elements constituting the first antenna and identifying the location corresponding to the main lobe of the sync function.

The AoA ($\phi_m$, $\phi_n$, etc.) may be estimated based on an angle ($\theta_m$, $\theta_n$, etc.) between each reception antenna element (m, n, etc.) and a center line (imaginary line between the center of the first antenna and a point $B_0$). Alternatively, the AoA for each antenna element, which is estimated in the above-described manner, may be expressed as Om and $\theta_n$.

In the exemplary embodiment shown in FIG. 5A, the size (diameter, length, etc.) of the EM lens may correspond to $D_y$. The distance between the center of the lens and the lower end thereof may correspond to $D_y/2$, and the distance between the center of the lens and the upper end thereof may correspond to $D_y/2$. The spacing between antenna elements may be set uniformly. Alternatively, the spacing between antenna elements may be set based on the angle ($\theta_m$, $\theta_n$, etc.) between each reception antenna element (m, n, etc.) and the center line. For example, the spacing between antenna elements may be set to be proportional to a sine value (sin $\theta_m$, sin $\theta_n$, etc.) of the angle ($\theta_m$, $\theta_n$, etc.) between each reception antenna element (m, n, etc.) and the center line.

FIG. 5A shows an exemplary embodiment in which the first antenna includes two-dimensionally arranged antenna elements and a two-dimensional lens. In the instant case, the first communication node may sequentially activate or deactivate each of the two-dimensionally arranged antenna elements and identify a reception result of the wireless signal incident through the two-dimensional lens. Through this, the first communication node may estimate the AoA of the received signal. However, this is merely an example for convenience of description, and exemplary embodiments of the communication system are not limited thereto. For example, the first antenna may be configured to include three-dimensionally arranged antenna elements and a three-dimensional lens. In the instant case, the first communication node may sequentially activate or deactivate each of the three-dimensionally arranged antenna elements and identify a reception result of the wireless signal incident through the three-dimensional lens. Through this, the first communication node may estimate the AoA of the received signal.

The communication system may support a lens MIMO antenna that takes into account the broadband characteristics of an ultra-high frequency band such as a terahertz wave band. An exemplary embodiment of the communication system may support a scheme of variably setting the size of the lens according to a change in the ultra-high frequency band such as a terahertz wave band.

An exemplary embodiment of the communication system may use a lens MIMO antenna composed of a plurality of antenna elements, and support a two-step AoA estimation scheme to reduce the amount of calculation or complexity required to estimate an AoA and a channel of a received signal. The two-step AoA estimation scheme may include a first step of dividing antenna elements into a plurality of antenna groups and deriving a candidate antenna group by comparing an estimated received strength at each antenna group with a predetermined threshold, and a second step of estimating the number of reception paths and an AoA of each path through precise sensing.

Although the scheme of estimating an AoA of a received signal in the lens MIMO antenna has been described with reference to FIG. 5A, exemplary embodiments of the communication system are not limited thereto. For example, in an exemplary embodiment of the communication system, the communication node transmitting wireless signals may determine a direction of the wireless signals based on the second exemplary embodiment of the antenna configuration.

As shown in FIG. 5B, the first communication node transmitting wireless signals may determine a transmission direction or an AOD of the wireless signals by selecting a specific antenna element (or antenna) to transmit the wireless signals from the first antenna having the same or similar structure as described with reference to FIG. 5A. In other words, the first communication node may select, in the first antenna, a specific antenna element (or antenna) to use (or activate) when transmitting the wireless signals, based on the transmission direction or AoD at which the wireless signals are desired to be transmitted.

Specifically, based on the angles ($\theta_m$, $\theta_n$, etc.) between the respective transmission antenna elements (m, n, etc.) and the center line (e.g. imaginary line between the center of the first antenna and the point $B_0$), the AODs (e.g. $\phi_m$, $\phi_n$, etc.) at the respective transmission antenna elements may be estimated. Alternatively, the AODs for the respective antenna elements estimated as described may be expressed as $Om$ and $\phi_n$.

FIG. 5B shows an exemplary embodiment in which the first antenna includes two-dimensionally arranged antenna elements and a two-dimensional lens. In the instant case, the first communication node may transmit wireless signals through the two-dimensional lens while sequentially activating or deactivating each of the two-dimensionally arranged antenna elements. The first communication node may receive a feedback for the wireless signals transmitted using an antenna element activated at a specific time, thereby identifying a direction in which the wireless signals transmitted from the corresponding antenna element are transmitted from the first antenna, a transmission result of the wireless signals transmitted by the corresponding antenna element, a reception result at the receiving node for the wireless signals transmitted by the corresponding antenna element, or the like. Through this, the first communication node may identify or estimate a transmission direction using each antenna element. Alternatively, the first communication node may identify or estimate a direction and/or location of the receiving node receiving the wireless signals transmitted by an antenna element by receiving a feedback for the wireless signals transmitted using the corresponding antenna element activated at a specific time. However, this is merely an example for convenience of description, and exemplary embodiments of the communication system are not limited thereto. For example, the first antenna may be configured to include three-dimensionally arranged antenna elements and a three-dimensional lens. In the instant case, the first communication node may identify a reception result for the wireless signals radiated through the three-dimensional lens by sequentially activating or deactivating each of the three-dimensionally arranged antenna elements. Through this, the first communication node may estimate, identify, or determine a transmission direction of the transmission signal or a direction of the receiving node.

In the communication system, if the transmitting node transmits wireless signals using the antenna described with reference to FIG. 5B and the receiving node receives the wireless signals using the antenna described with reference to FIG. 5A, both sides of the transmitting and receiving nodes in the communication system can efficiently estimate, identify, or determine direction information such as the AoD, AoA, etc. of the wireless signals based on the second exemplary embodiment of the antenna configuration in the communication system.

Figure 6:
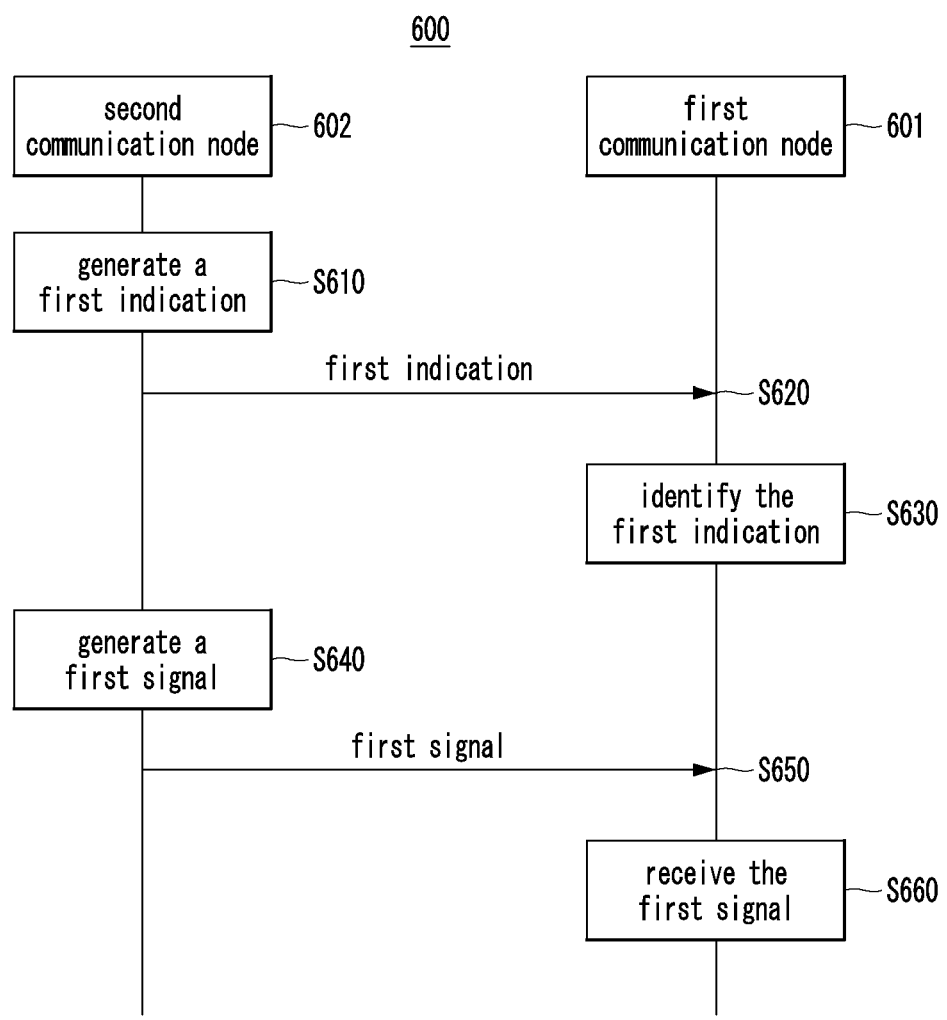
FIG. 6 is a sequence chart for describing various exemplary embodiments of a signal transmission and reception method in a communication system.

FIG. 6 is a sequence chart for describing a first exemplary embodiment of a signal transmission and reception method in a communication system.

As shown in FIG. 6, a communication system 600 may support MIMO-based communication. The communication system may include one or more communication nodes that transmit and/or receive wireless signals. Each of the one or more communication nodes included in the communication system may include one or more antennas capable of transmitting and/or receiving wireless signals based on the lens MIMO scheme. Each of the one or more communication nodes included in the communication system may include one or more antennas that are the same as or similar to the first antenna 410 described with reference to FIG. 4. According to the first exemplary embodiment of the signal transmission and reception method in the communication system, operations for selecting a lens may be performed in the lens MIMO scheme. Hereinafter, in describing the first exemplary embodiment of the signal transmission and reception method in the communication system with reference to FIG. 6, descriptions that are redundant with those described with reference to FIGS. 1 to 5A may be omitted.

In an exemplary embodiment of the communication system 600, a first communication node 601 may correspond to a receiving node and a second communication node 602 may correspond to a transmitting node. The second communication node 602 may transmit data to the first communication node 601 through a first signal in an ultra-high frequency band, such as a terahertz wave band. The first communication node 601 may use one or more lens MIMO-based antennas to receive signals transmitted from the second communication node 602 in an ultra-high frequency band such as a terahertz wave band. The second communication node 602 may transmit a first indication or first indication information to the first communication node 601 before transmitting the first signal to the first communication node 601.

On the other hand, in another exemplary embodiment of the communication system 600, the second communication node 602 may correspond to a base station, and the first communication node 601 may correspond to a terminal. The first communication node 601 may use one or more lens MIMO-based antennas to receive signals transmitted by the second communication 602 or other communication nodes in an ultra-high frequency band such as a terahertz wave band. The second communication node 602 may transmit a first indication or first indication information to the first communication node 601.

According to the first exemplary embodiment of the signal transmission and reception method in the communication system, the second communication node 602 may generate the first indication (S610). Here, the first indication may include information for reception of wireless signals using one or more lens MIMO-based antennas. The first indication may include information on a reference frequency, frequency band, corresponding lens, etc. of wireless signals transmitted from the second communication node 602. For example, the first indication may include at least some of the information shown in Table 1 or Table 2.

The second communication node 602 may transmit the first indication to the first communication node 601 (S620). The first indication may be transmitted to the first communication node 601 as being included in system information (such as SIB, MIB, etc.) or an RRC message (such as RRCReconfiguration, etc.) transmitted from the second communication node 602.

The first communication node 601 may receive the first indication transmitted from the second communication node 602 (S620). The first communication node 601 may identify information included in the first indication (S630). For example, the first communication node 601 may identify information on the reference frequency, frequency band, corresponding lens, or the like of the wireless signals transmitted from the second communication node 602 based on the first indication.

The second communication node 602 may generate a first signal to transmit to the first communication node 601 (S640). The second communication node 602 may transmit the generated first signal to the first communication node 601 (S650). Here, the first signal may be transmitted based on the reference frequency and/or frequency band indicated by the first indication. The first communication node 601 may receive the first signal (S660). Here, the first communication node 601 may receive the first signal using a lens corresponding to the frequency of the first signal.

Meanwhile, if there is a change in the mapping relationship for the lens transmitted through the first indication, the second communication node 602 may inform this to the first communication node 601 through an additional signal (such as a second indication). Alternatively, the first communication node 601 may transmit information on a lens which the first communication node 601 uses for reception to the second communication node 602. The first communication node 601 and/or the second communication node 602 may set an index or indicator for each lens in the same or similar manner as shown in Table 3.

TABLE 3

| Reference lens | Lens index |
| --- | --- |
| Lens #1 | 0 (00) |
| Lens #2 | 1 (01) |
| Lens #3 | 2 (10) |
| Lens #4 | 3 (11) |

The index of the lens may be expressed as a decimal value (i.e. 0, 1, 2, 3) or 2-bit value (i.e., 00, 01, 10, 11), as shown in Table 3. In an exemplary embodiment of the communication system 600, when the frequency band (reference frequency) used for communication is changed to a new frequency band, the lens (or reference lens group) may need to be changed according to the changed frequency band (i.e. newly allocated frequency band). When the first communication node 601 is capable of utilizing a total of four lenses, the second communication node 602 may determine a lens suitable for a current situation of the first communication node 601 from among candidate lenses of the first communication node 601 based on the newly allocated frequency band, and transmit a signal indicating the first communication node 601 to select the corresponding lens. Information on the index or indicator for each lens as shown in Table 3 may be transmitted through system information or RRC message. When the number of lenses usable by the first communication node 601 is k, information on the index for each lens may be transmitted as being assigned to at least $\log_2 k$ bits. For example, when the number of usable lenses is 4 as shown in Table 3, information on the index for each lens may be transmitted as being allocated to at least 2 bits. On the other hand, when the number of usable lenses is 1, information on the index for each lens may be transmitted as being allocated to at least 1 bit.

The situation shown in FIG. 6 may correspond to a downlink transmission situation in which the second communication node 602 corresponding to the base station transmits signaling such as the first indication and wireless signals to one or more terminals including the first communication node 601. However, this is merely an example for convenience of description, and the first exemplary embodiment of the signal transmission and reception method in the communication system is not limited thereto. For example, the first exemplary embodiment of the signal transmission and reception method in the communication system may be applied to an uplink transmission situation in which the second communication node 602 is a terminal and the first communication node 601 is a base station. Alternatively, the first exemplary embodiment of the signal transmission and reception method in the communication system may not be limited to a specific transmission mode such as uplink transmission, downlink transmission, and sidelink transmission, and may be applied to a situation in which at least one of the transmitting and receiving nodes includes lens MIMO antenna(s). On the other hand, the first exemplary embodiment of the signal transmission and reception method in the communication system may be implemented in a scheme where the first communication node 601 transmits signaling (e.g. first indication) including information on reference frequencies to the second communication node 602, and receives a wireless signal transmitted from the second communication node 602 using one of the reference frequencies through a lens MIMO antenna.

Figure 7:
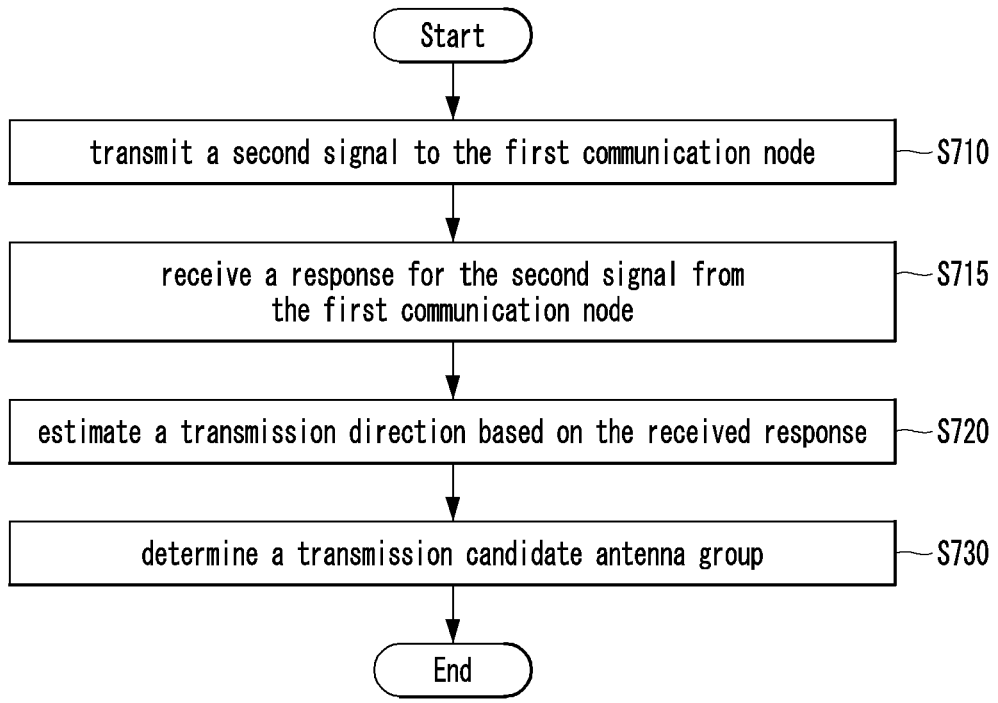
FIG. 7 is a flowchart for describing various exemplary embodiments of a signal transmission and reception method in a communication system.

FIG. 7 is a flowchart for describing a second exemplary embodiment of a signal transmission and reception method in a communication system.

As shown in FIG. 7, a communication system may be the same as or similar to the communication system 600 described with reference to FIG. 6. One or more communication nodes included in the communication system may include one or more antennas that are the same as or similar to the first antenna 410 described with reference to FIG. 4. According to the second exemplary embodiment of the signal transmission and reception method in the communication system, operations for estimating (or determining) a transmission direction in the lens MIMO scheme may be performed. Hereinafter, in describing the second exemplary embodiment of the signal transmission and reception method in the communication system with reference to FIG. 7, descriptions that are redundant with those described with reference to FIGS. 1 to 6 may be omitted.

In an exemplary embodiment of the communication system, a first communication node may correspond to a receiving node and a second communication node may correspond to a transmitting node. The second communication node may estimate a transmission direction for the first communication node by transmitting a second signal to the first communication node. The second communication node may determine a transmission candidate antenna group corresponding to the estimated transmission direction for the first communication node. Here, the second signal may correspond to a signal for estimating the transmission direction at the second communication node for the first communication node. The second signal may be a signal in an ultra-high frequency band, such as a terahertz wave.

Specifically, the second communication node may transmit the second signal to the first communication node (S710). The second communication node may transmit the second signal to the first communication node while sequentially activating at least some of one or more antenna elements constituting a first antenna included in the second communication node.

The second communication node may receive a response (hereinafter, a second response) for the second signal from the first communication node (S715). The second communication node may perform estimation of the transmission direction for the first communication node based on the second response received from the first communication node in step S715 (S720).

In an exemplary embodiment of the communication system, the second response may include information on a result of receiving the second signal at the first communication node. Alternatively, the second response may include information obtained by the first communication node from the result of receiving the second signal. For example, the second response may include information such as a reception angle, reception direction, reception strength, and channel information between the first and second communication nodes with respect to the second signal. Alternatively, the second response may include information on a location of the first communication node. Here, the information on the location of the first communication node may include information on an absolute location of the first communication node. Alternatively, the information on the location of the first communication node may include information on a relative location of the first communication node with respect to the second communication node. In the instant case, the second communication node may determine the transmission direction for the first communication node based on the information included in the second response.

Meanwhile, in another exemplary embodiment of the communication system, the second communication node may not transmit a separate wireless signal to the first communication node, and may estimate or identify the transmission direction for the first communication node based on a wireless signal transmitted and received from the first communication node. For example, the second communication node may receive a signal transmitted from the first communication node by using the first antenna, or a second antenna that is a reception antenna having the same or similar structure as the first antenna. The second communication node may estimate a direction of the first communication node based on an angle at which the signal transmitted from the first communication node is received by the first antenna (or the second antenna). Based on the direction of the first communication node estimated as described above, the second communication node may estimate the transmission direction for the first communication node.

The second communication node may determine a transmission candidate antenna group based on the estimated transmission direction for the first communication node (S730). For example, the transmission candidate antenna group determined in step S730 may include one or more antenna elements corresponding to the estimated direction of the first communication node. The transmission candidate antenna group determined in step S730 may include antenna elements adjacent to one or more antenna elements corresponding to the estimated direction of the first communication node. For example, in step S730, the transmission candidate antenna group may be determined identically or similarly to Table 4.

TABLE 4

| Observer | Direction of observation target (first communication node) | Transmission candidate antenna group |
| --- | --- | --- |
| Second communication node | $\phi_{2,i}$ | $A_2 \#(i-1)$, $A_2 \#i$, $A_2 \#(i+1)$ |

Referring to Table 4, the directions of the first communication node estimated at the second communication node may be expressed as $\phi_{2,i}$ (or $\theta_{2,i}$, etc.). Here, i may be an index corresponding to each of a plurality of directions in which the second communication node can transmit a wireless signal using the first antenna. Alternatively, i may be an index corresponding to each antenna element corresponding to each transmission direction in the first antenna of the second communication node. The second communication node may configure the transmission candidate antenna group to include antenna elements $A_2 \#i$ corresponding to the estimated directions $\phi_{2,i}$. The second communication node may configure the transmission candidate antenna group to include antenna elements $A_2 \#(i-1)$ and $A_2 \#(i+1)$ adjacent to the antenna element $A_2 \#i$ corresponding to the estimated direction of the first communication node. The number of antenna elements included in the transmission candidate antenna group may be $n_2$. Here, $n_2$ may correspond to the number of antenna elements that can be used simultaneously in the first antenna of the second communication node (i.e., the number of available transmission antenna elements). Table 4 shows an exemplary embodiment in which $n_2$ is 3. However, this is merely an example for convenience of description, and the second exemplary embodiment of the signal transmission and reception method in the communication system is not limited thereto. For example, when $n_2$ is 5, the transmission candidate antenna group may include an antenna element $A_2 \#i$ corresponding to the estimated direction of the first communication node, and may further include four antenna elements (e.g. $A_2 \#(i-2)$, $A_2 \#(i-1)$, $A_2 \#(i+1)$, $A_2 \#(i+2)$) relatively close to the antenna element $A_2 \#i$.

Figure 8:
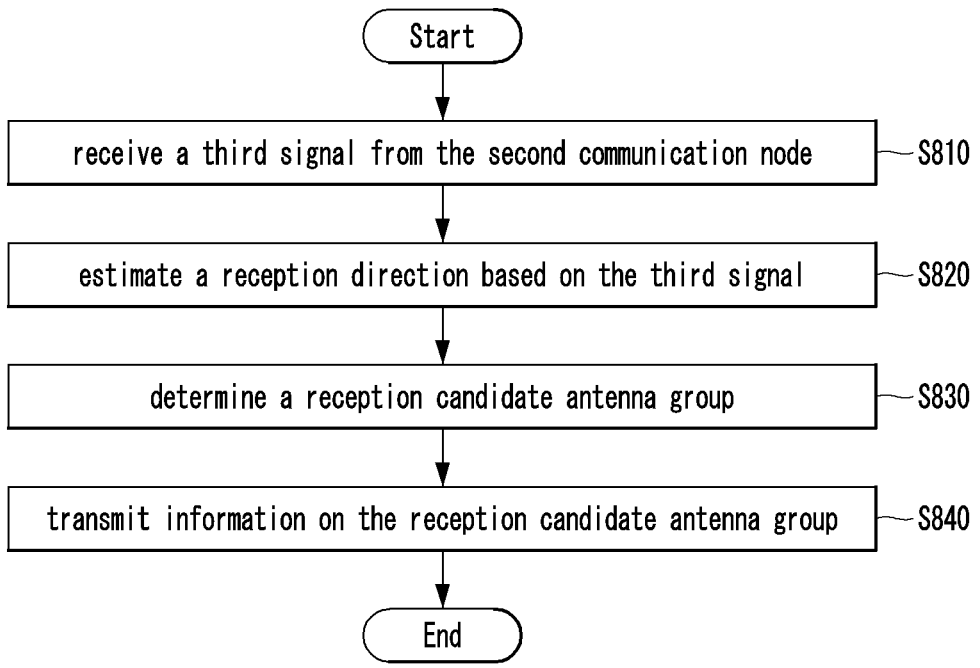
FIG. 8 is a flowchart for describing various exemplary embodiments of a signal transmission and reception method in a communication system.

FIG. 8 is a flowchart for describing a third exemplary embodiment of a signal transmission and reception method in a communication system.

As shown in FIG. 8, a communication system may be the same as or similar to the communication system 600 described with reference to FIG. 6. One or more communication nodes included in the communication system may include one or more antennas that are the same as or similar to the first antenna 410 described with reference to FIG. 4. According to the third exemplary embodiment of the signal transmission and reception method in the communication system, operations for estimating (or determining) a transmission direction in the lens MIMO scheme may be performed. Hereinafter, in describing the third exemplary embodiment of the signal transmission and reception method in the communication system with reference to FIG. 8, descriptions that are redundant with those described with reference to FIGS. 1 to 7 may be omitted.

In an exemplary embodiment of the communication system, a first communication node may correspond to a receiving node and a second communication node may correspond to a transmitting node. The first communication node may estimate a reception direction for a wireless signal from the second communication node by receiving a third signal from the second communication node. The first communication node may determine a reception candidate antenna group corresponding to the estimated reception direction. Here, the third signal may correspond to a signal that the first communication node uses to estimate a reception direction for a wireless signal from the second communication node. The third signal may be a signal in an ultra-high frequency band, such as a terahertz wave.

Specifically, the first communication node may receive the third signal from the second communication node (S810). The first communication node may receive the third signal while sequentially activating at least some of one or more antenna elements constituting a first antenna included in the first communication node. Here, the third signal may be the same as or different from the second signal described with reference to FIG. 7. The first communication node may perform estimation of a reception direction for a wireless signal from the second communication node based on the third signal received from the second communication node in step S810 (S820). In other words, the first communication node may perform estimation of a direction of the second communication node.

In an exemplary embodiment of the communication system, the third signal may include information on a location or direction of the second communication node. Alternatively, the third signal may include information on a result of receiving a signal transmitted from the first communication node at the second communication, or may include information obtained based on the reception result. For example, the third signal may include information such as a reception angle, reception direction, reception strength, and channel information between the first and second communication nodes for the signal received by the second communication node from the first communication node. Alternatively, the third signal may include information on a location of the second communication node. In the instant case, the first communication node may estimate or identify the direction of the second communication node based on the information included in the third signal.

Meanwhile, in another exemplary embodiment of the communication system, the first communication node may estimate the direction of the second communication node based on an angle at which a signal transmitted from the second communication node is received at the first antenna. Based on the direction of the second communication node estimated as described above, the first communication node may estimate a reception direction for a wireless signal from the second communication node.

The second communication node may determine a reception candidate antenna group based on the reception direction estimated in step S820 (S830). For example, the reception candidate antenna group determined in step S830 may include one or more antenna elements corresponding to the estimated direction of the second communication node. The reception candidate antenna group determined in step S830 may include antenna elements adjacent to one or more antenna elements corresponding to the estimated direction of the second communication node. For example, in step S830, the reception candidate antenna group may be determined identically or similarly to Table 5.

TABLE 5

| Observer | Direction of observation target (second communication node) | Reception candidate antenna group |
|---|---|---|
| first communication node | $\phi_{1,j}$ | $A_1$ #(j − 1), $A_1$ #j, $A_1$ #(j + 1) |

Referring to Table 5, the direction of the second communication node estimated at the first communication node may be expressed as $\phi_{l,j}$ (or $\theta_{l,j}$, etc.). Here, j may be an index corresponding to each of a plurality of directions in which the first communication node can transmit a wireless signal using the first antenna. Alternatively, j may be an index corresponding to each antenna element corresponding to each transmission direction in the first antenna of the first communication node. The first communication node may configure the reception candidate antenna group to include antenna elements $A_1$ #j corresponding to the estimated direction $\phi_{l,j}$. The first communication node may form the reception candidate antenna group to include antenna elements A: #(j−1) and $A_1$ #(j+1) adjacent to the antenna element $A_1$ #j corresponding to the estimated direction of the second communication node. The number of antenna elements included in the reception candidate antenna group may be $n_1$. Here, $n_1$ may correspond to the number of antenna elements that can be used simultaneously in the first antenna of the first communication node (i.e. the number of available reception antenna elements). Table 5 may show an exemplary embodiment where mi is 3. However, this is merely an example for convenience of description, and the third exemplary embodiment of the signal transmission and reception method in the communication system is not limited thereto. For example, when mi is 5, the reception candidate antenna group may include an antenna element $A_1$ #j corresponding to the estimated direction of the second communication node, and may further include four antenna elements (e.g. $A_1$ #(j−2), $A_1$ #(j−1), $A_1$ #(j+1), A: #(j+2)) relatively close to the antenna element $A_1$ #j.

The first communication node may transmit information on the reception candidate antenna group determined in step S830 to the second communication node (S840). In step S840, the information on the reception candidate antenna group may be transmitted through am RRC message or RRC signaling, such as an RRC connection reconfiguration complete message, UE information response, and UE assistance information. Alternatively, separate signaling (such as RRC signaling) may be defined to deliver information on the reception candidate antenna group.

Figure 9:
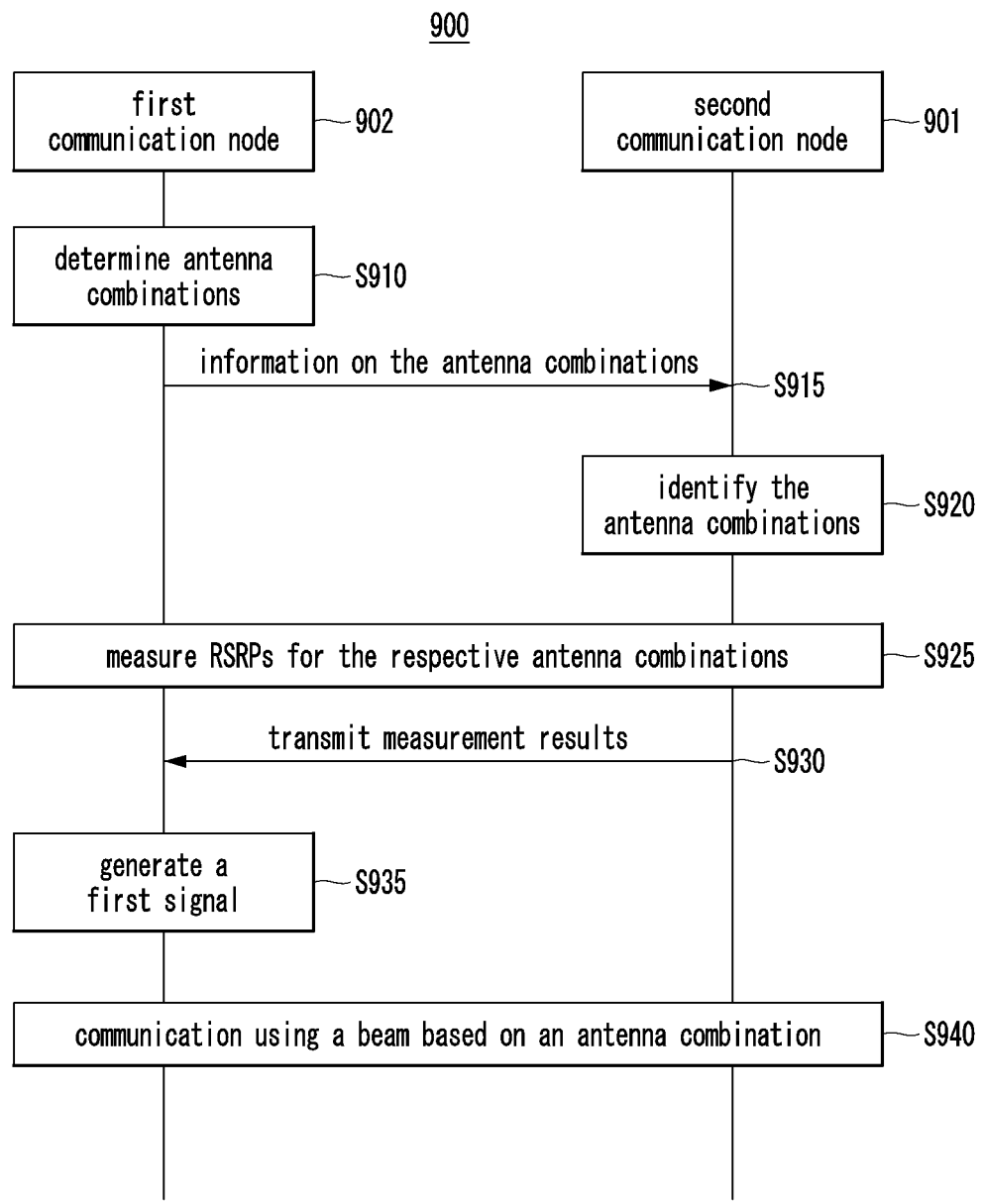
FIG. 9 is a sequence chart for describing various exemplary embodiments of a signal transmission and reception method in a communication system.

FIG. 9 is a sequence chart for describing a fourth exemplary embodiment of a signal transmission and reception method in a communication system.

As shown in FIG. 9, a communication system 900 may be the same as or similar to the communication system 600 described with reference to FIG. 6. One or more communication nodes included in the communication system 900 may include one or more antennas that are the same as or similar to the first antenna 410 described with reference to FIG. 4. According to the fourth exemplary embodiment of the signal transmission and reception method in the communication system, operations for determining or selecting combination(s) of transmission and reception antenna elements in the lens MIMO scheme may be performed. Hereinafter, in describing the fourth exemplary embodiment of the signal transmission and reception method in the communication system with reference to FIG. 9, descriptions that are redundant with those described with reference to FIGS. 1 to 8 may be omitted.

One-to-One Transmission/Reception Antenna Element Combination Determination Scheme In an exemplary embodiment of the communication system 900, a first communication node 901 may correspond to a receiving node and a second communication node 902 may correspond to a transmitting node. The second communication node 902 may estimate a transmission direction for the first communication node 901 using the same or similar method as described with reference to FIG. 7, and may determine a transmission candidate antenna group corresponding to the estimated transmission direction. The first communication node 901 may estimate a reception direction for a signal from the second communication node 902 using the same or similar method as described with reference to FIG. 8, and may determine a reception candidate antenna group corresponding to the estimated reception direction. The reception candidate antenna group may include one or more reception candidate antenna elements. The first communication node 901 may transmit information on the determined reception candidate antenna group to the second communication node 902. The second communication node 902 may receive the information on the reception candidate antenna group determined by the first communication node 901 from the first communication node 901. The reception candidate antenna group may include one or more reception candidate antenna elements.

The second communication node 902 may determine one or more antenna element combinations (or antenna combinations) based on the information on the reception candidate antenna group determined by the first communication node 901 and the information on the transmission candidate antenna group determined by the second communication node 902. Here, each of the one or more antenna element combinations (or antenna combinations) may be configured as a combination of one or more transmission candidate antenna elements included in the transmission candidate antenna group determined by the second communication node 902, and one or more reception candidate antenna elements included in the reception candidate antenna group determined by the first communication node 901. For example, the one or more antenna element combinations may be configured identically or similarly to Table 6.

TABLE 6

| Combination index (4 bits) | Transmission antenna elements (second communication node) | Reception antenna element (first communication node) |
|---|---|---|
| 1 (0000) | $A_2$ #1, $A_2$ #2 | $A_1$ #3 |
| 2 (0001) | $A_2$ #1, $A_2$ #2 | $A_1$ #4 |
| 3 (0010) | $A_2$ #1, $A_2$ #2 | $A_1$ #5 |
| ... | ... | ... |
| 8 (0111) | $A_2$ #2, $A_2$ #3 | $A_1$ #4 |
| 9 (1000) | $A_2$ #2, $A_2$ #3 | $A_1$ #5 |

The second communication node 902 may transmit information on the one or more antenna element combinations determined in step S910 to the first communication node 901 (S915). The first communication node 901 may receive the information on the one or more antenna element combinations transmitted from the second communication node 902 (S915). The first communication node 901 may identify the information on the one or more antenna element combinations expressed in the same or similar manner as Table 6 (S920).

The first and second communication nodes 091 and 902 may perform a procedure for measuring reception strengths through wireless signal transmission and reception using the one or more antenna element combinations (S925). For example, the first and second communication nodes 901 and 902 may perform a procedure of measuring a reference signal received power (RSRP) for each of the one or more antenna element combinations. For example, in step S925, the second communication node 902 may transmit a wireless signal (e.g. reference signal) using corresponding transmission antenna elements for each combination index i (1, 2, ..., 9). The second communication node 902 may receive the reference signal for each combination index i using a corresponding reception antenna element. That is, in step S925, a result (e.g. RSRP) of receiving and measuring the wireless signal transmitted from the transmission antenna elements of the second communication node 902 at the reception antenna element of the first communication node 901 may be measured for each combination index i. The first communication node 901 may transmit information on the measurement results obtained in step S925 to the second communication node 902 (S930). The information on the measurement results transmitted from the first communication node 901 to the second communication node 902 in step S930 may include at least some of information shown in Table 7.

TABLE 7

| Combination index (4 bits) | Transmission antenna elements (second communication node) | Reception antenna element (first communication node) | RSRP |
|---|---|---|---|
| 1 (0000) | $A_2$ #1, $A_2$ #2 | $A_1$ #3 | RSRP_69 |
| 2 (0001) | $A_2$ #1, $A_2$ #2 | $A_1$ #4 | RSRP_107 |
| 3 (0010) | $A_2$ #1, $A_2$ #2 | $A_1$ #5 | RSRP_52 |
| ... | ... | ... | ... |
| 8 (0111) | $A_2$ #2, $A_2$ #3 | $A_1$ #4 | RSRP_98 |
| 9 (1000) | $A_2$ #2, $A_2$ #3 | $A_1$ #5 | RSRP_88 |

The second communication node 902 may receive the information on the measurement results transmitted from the first communication node 901 (S930). The second communication node 902 may determine a priority for each antenna element combination based on the information on the measurement results received in step S930 (S935). That is, the second communication node 902 may determine priorities for the respective antenna element combinations based on the reception strength measurement results for the respective antenna element combinations received from the first communication node 901. For example, when the information on the measurement results is given as in Table 7, the priorities for the respective antenna element combinations may be determined in the same or similar manner as Table 8.

TABLE 8

| Combination index (4 bits) | Priority |
|---|---|
| 1 (0000) | 7 |
| 2 (0001) | 1 (selected) |
| 3 (0010) | 9 |
| ... | ... |
| 8 (0111) | 3 |
| 9 (1000) | 5 |

Referring to Table 8, the second communication node 902 may determine the priorities for the respective combination indexes based on the reception strength values corresponding to the respective combination indexes in the measurement results expressed as shown in Table 7. The second communication node 902 may select one or more indexes based on the determined priorities. Table 8 shows an exemplary embodiment in which the second communication node 902 selects a combination index 2, but this is merely an example for convenience of description, and the fourth exemplary embodiment of the signal transmission and reception method is not limited thereto. In an exemplary embodiment of the communication system, the first and second communication nodes 910 and 902 may perform communication with each other based on information on the reception strengths for the respective antenna element combinations measured in step S925, or the priorities determined in step S940.

The operations described with reference to Tables 6 to 8 and FIG. 9 may be summarized in Table 9.

TABLE 9

| Combination index (4 bits) | Transmission antenna elements (second communication node) | Reception antenna element (first communication node) | RSRP | Priority |
|---|---|---|---|---|
| 1 (0000) | $A_2$ #1, $A_2$ #2 | $A_1$ #3 | RSRP_69 | 7 |
| 2 (0001) | $A_2$ #1, $A_2$ #2 | $A_1$ #4 | RSRP_107 | 1 (selected) |
| 3 (0010) | $A_2$ #1, $A_2$ #2 | $A_1$ #5 | RSRP_52 | 9 |
| ... | ... | ... | ... | ... |
| 8 (0111) | $A_2$ #2, $A_2$ #3 | $A_1$ #4 | RSRP_98 | 3 |
| 9 (1000) | $A_2$ #2, $A_2$ #3 | $A_1$ #5 | RSRP_88 | 5 |

Table 9 shows a beam/antenna element selection process when the second communication node knows information on the antenna element combination(s) of the first and second communication nodes, information on the combination index(es) thereof, and the like. In an exemplary embodiment of the communication system, the second communication node (e.g. base station) may transmit a reference signal to the first communication node (e.g. terminal). The second communication node may provide information on combination index(es), an indicator related to measurement and reporting of reception strengths of the reference signal, etc. to the first communication node. The second communication node may transmit the information on the combination index(es), indicator related to measurement and response (or reporting) of the reception strengths of the reference signal, etc., before transmitting the reference signal, or after transmitting the reference signal. Alternatively, the information may be transmitted together with the reference signal. The first communication node may measure the reception strength for each antenna element combination based on the information and reference signal transmitted from the second communication node, and transmit a response (or report) including information on the measured reception strengths to the second communication node. The second communication node may determine a priority for each antenna combination based on the response (or report) from the first communication node. The second communication node may transmit, to the first communication node, information on the determined priorities of the respective antenna combinations determined, or information on one or more antenna combinations selected based on the determined priorities.

One-to-Many Transmission/Reception Antenna Element Combination Determination Scheme The second communication node may perform the operations described with reference to FIG. 9 with other communication nodes in addition to the first communication node. Here, the second communication node may be referred to as 'transmitting node', and other communication nodes including the first communication node may be referred to as 'receiving nodes'. In an exemplary embodiment of the communication system, a transmitting node may correspond to a base station, and receiving nodes may correspond to terminals. In the instant case, the 'one-to-many transmission/reception antenna element combination determination scheme' may be referred to as 'antenna element combination determination scheme between base station and terminals in a multi-terminal environment' or 'beamforming scheme between base station and terminals in a multi-terminal environment'. However, this is merely an example for convenience of description, and the fourth exemplary embodiment of the signal transmission and reception method is not limited thereto.

When performing operations for determining antenna element combination(s) with a plurality of receiving nodes, the transmitting node may comprehensively consider communication performances of the respective receiving nodes. For example, when two or more receiving nodes exist, a link between the transmitting node and one receiving node (e.g. link between a transmission beam and a reception beam) may act as interference to a link between the transmitting node and another receiving node. Therefore, for interference management, it may be required to simultaneously consider antenna gains for multiple receiving nodes to determine antenna element combination(s).

In an exemplary embodiment of the communication system, each of the transmitting node and the plurality of receiving nodes may determine a lens to apply to its antenna. This may be the same as or similar to the configurations described with reference to FIG. 6. Estimation of an angle of departure and an angle of arrival may be performed between the transmitting node and each of the plurality of receiving nodes. This may be the same or similar to the configurations described with reference to FIGS. 7 and 8. The transmitting node may determine transmission candidate antenna group(s) for the receiving nodes. For example, the transmitting node may determine one transmission candidate antenna group for the plurality of receiving nodes. Alternatively, the transmitting node may determine a transmission candidate antenna group for each of the plurality of receiving nodes. For example, the transmitting node may determine a first transmission candidate antenna group for a first receiving node, a second transmission candidate antenna group for a second receiving node, and the like. Each of the receiving nodes may determine a reception candidate antenna group based on the its estimated angle of arrival (or reception direction) with respect to the transmitting node. Each of the receiving nodes may determine a reception candidate antenna group based on the its estimated angle of arrival (or reception direction) with respect to each transmitting node. All possible combinations of transmission and reception antenna elements may be identified between one transmitting node and multiple receiving nodes. The plurality of receiving nodes may each perform reception strength measurement for the received reference signal. As a result, the performances of all possible combinations of transmission and reception antenna elements may be measured.

Specifically, the transmission candidate antenna group for the plurality of receiving nodes may be determined by the transmitting node identically or similarly to Table 10.

TABLE 10

| Observer | Observation target | Direction of observation target | Transmission candidate antenna group |
|---|---|---|---|
| Transmitting node | Receiving node A | $\phi_{Tx, 2}$ | $A_{Tx}$ #1, $A_{Tx}$ #2, $A_{Tx}$ #3, $A_{Tx}$ #4, |
| Transmitting node | Receiving node B | $\phi_{Tx, 3}$ | $A_{Tx}$ #9, $A_{Tx}$ #10, $A_{Tx}$ #11 |
| Transmitting node | Receiving node C | $\phi_{Tx, 10}$ | |

Referring to Table 10, the transmitting node may determine the transmission candidate antenna group based on a direction $\phi_{Tx,2}$ of a receiving node A, a direction $\phi_{Tx,3}$ of a receiving node B, a direction $\phi_{Tx,10}$ of a receiving node C, and the number $n_2$ of available transmission antenna elements of the transmitting node.

$n_2$ may be a reference for determining the number of transmission candidate antenna elements corresponding to the direction of each receiving node. For example, Table 10 shows an exemplary embodiment where $n_2$=3. In the instant case, the transmission candidate antenna group may be configured as a union set $\{A_{Tx}\#1, A_{Tx}\#2, A_{Tx}\#3, A_{Tx}\#4, A_{Tx}\#9, A_{Tx}\#10, A_{Tx}\#11\}$ of a set of three transmission candidate antenna elements $\{A_{Tx}\#1, A_{Tx}\#2, A_{Tx}\#3\}$ corresponding to the direction $\phi_{Tx,2}$ of the receiving node A, a set of three transmission candidate antenna elements $\{A_{Tx}\#2, A_{Tx}\#3, A_{Tx}\#4\}$ corresponding to the direction $\phi_{Tx,3}$ of the receiving node B, and a set of three corresponding transmission candidate antenna elements $\{A_{Tx}\#9, A_{Tx}\#10, A_{Tx}\#11\}$ corresponding to the direction $\phi_{Tx,10}$ of the receiving node C.

Alternatively, $n_2$ may be a reference for determining the number of transmission candidate antenna elements included in the transmission candidate antenna group. For example, Table 10 be regarded as showing an exemplary embodiment where $n_2$=7. In the instant case, the transmission candidate antenna group may include 7 transmission candidate antenna elements $\{A_{Tx}\#1, A_{Tx}\#2, A_{Tx}\#3, A_{Tx}\#4, A_{Tx}\#9, A_{Tx}\#10, A_{Tx}\#11\}$ corresponding to the direction $\phi_{Tx,2}$ of the receiving node A, the direction $\phi_{Tx,3}$ of the receiving node B, and the direction $\phi_{Tx,10}$ of the receiving node C.

Meanwhile, the reception candidate antenna groups for the transmitting node may be determined by the plurality of receiving nodes identically or similarly to Table 11.

TABLE 11

| Observer | AoA of received signal (direction of transmitting node) | Reception candidate antenna group (Case #1) | Reception candidate antenna group (Case #2) |
|---|---|---|---|
| Receiving node A | $\phi_{Rx\_A,4}$ | $A_{Rx\_A}\#4$ | $A_{Rx\_A}\#4$ |
| Receiving node B | $\phi_{Rx\_B,5}$ | $A_{Rx\_B}\#5$ | $A_{Rx\_B}\#4, \#5$ |
| Receiving node C | $\phi_{Rx\_C,6}$ | $A_{Rx\_C}\#2$ | $A_{Rx\_C}\#2, \#3$ |

Referring to Table 11, the receiving nodes may determine the reception candidate antenna group (or reception candidate antenna groups) based on the directions $\phi_{Rx\_A,4}$, $\phi_{Rx\_B,5}$, and $\phi_{Rx\_C,6}$ of the transmitting node (or AOAs of the received signal transmitted from the transmitting node) and the numbers $n_{1\_A}$, $n_{1\_B}$ and $n_{1\_C}$ of available antenna elements at the respective receiving nodes.

Here, each of $n_{1\_A}$, $n_{1\_B}$ and $n_{1\_C}$ may be a reference for determining the number of reception candidate antenna elements corresponding to the direction of the transmitting node from the perspective of each receiving node. For example, Case #1 of Table 11 shows an exemplary embodiment in which $n_{1\_A}$=1, $n_{1\_B}$=1, and $n_{1\_C}$=1. In the instant case, the reception candidate antenna group may include reception candidate antenna elements $A_{Rx\_A}\#4$, $A_{Rx\_B}\#5$, and $A_{Rx\_C}\#2$ corresponding to the directions $\phi_{Rx\_A,4}$, $\phi_{Rx\_B,5}$, and $\phi_{Rx\_C,6}$ of the transmitting node from the perspective of the respective receiving nodes. On the other hand, Case #2 of Table 11 shows an exemplary embodiment where $n_{1\_A}$=1, $n_{2\_B}$=2, and $n_{1\_C}$=2. In the instant case, the reception candidate antenna group (or reception candidate antenna groups) may include $A_{Rx\_A}\#4$ corresponding to the direction $\phi_{Rx\_A,4}$ of the transmitting node, $A_{Rx\_B}\#5$ and $A_{Rx\_B}\#5$ corresponding to the direction $\phi_{Rx\_B,5}$ of the transmitting node, and $A_{Rx\_C}\#2$ and $A_{Rx\_C}\#3$ corresponding to the direction $\phi_{Rx\_C,6}$ of the transmitting node, from the perspective of the respective receiving nodes.

The transmitting node may obtain information on the reception candidate antenna group(s) from the receiving nodes. The transmitting node may determine one or more antenna element combinations (or antenna combinations) based on information on the transmission candidate antenna group and information on the reception candidate antenna group(s). Here, each of the one or more antenna element combinations may be configured as a combination of one or more transmission candidate antenna elements included in the transmission candidate antenna group determined by the transmission node, and one or more reception candidate antenna elements included in the reception candidate antenna groups determined by the receiving nodes. For example, information on the one or more antenna element combinations may be configured to include at least some of information shown in Table 12.

TABLE 12

| Combination index (6 bits) | Transmission antenna elements (transmitting node) | Reception antenna elements (receiving node) | DS of receiving node | LR of receiving node | RSRP |
|---|---|---|---|---|---|
| 1 (000000) | $A_{Tx}\#1$, $A_{Tx}\#2$, $A_{Tx}\#3$ | $A_{Rx\_A}\#4$ $A_{Rx\_B}\#5$ $A_{Rx\_C}\#2$ | $DS_A$ $DS_B$ $DS_C$ | $LR_A$ $LR_B$ $LR_C$ | RSRP_69 RSRP_87 RSRP_52 |
| ... | ... | ... | ... | ... | ... |
| 16 (001111) | $A_{Tx}\#2$, $A_{Tx}\#3$, $A_{Tx}\#10$ | $A_{Rx\_A}\#4$ $A_{Rx\_B}\#5$ $A_{Rx\_C}\#2$ | $DS_A$ $DS_B$ $DS_C$ | $LR_A$ $LR_B$ $LR_C$ | RSRP_75 RSRP_80 RSRP_102 |
| ... | ... | ... | ... | ... | ... |
| 19 (010010) | $A_{Tx}\#2$, $A_{Tx}\#4$, $A_{Tx}\#10$ | $A_{Rx\_A}\#4$ $A_{Rx\_B}\#5$ $A_{Rx\_C}\#2$ | $DS_A$ $DS_B$ $DS_C$ | $LR_A$ $LR_B$ $LR_C$ | RSRP_95 RSRP_88 RSRP_100 |
| ... | ... | ... | ... | ... | ... |
| 35 (100010) | $A_{Tx}\#9$, $A_{Tx}\#10$, $A_{Tx}\#11$ | $A_{Rx\_A}\#4$ $A_{Rx\_B}\#5$ $A_{Rx\_C}\#2$ | $DS_A$ $DS_B$ $DS_C$ | $LR_A$ $LR_B$ $LR_C$ | RSRP_69 RSRP_77 RSRP_105 |

Referring to Table 12, when the transmission candidate antenna group of the transmitting node and the reception candidate antenna groups of the receiving nodes are determined, the transmitting node may select antenna elements according to the number of available antennas of each of them to determine possible combinations of transmission and reception antennas. Here, in order to determine priorities of the respective antenna combinations, the transmitting node may consider a plurality of characteristics and conditions such as mobilities (or Doppler shifts (DSs)) of the respective receiving nodes, latency requirements (LR) of the respective receiving nodes, network latency, and reception strengths (e.g. RSRP) of reference signals (e.g. SSBs or CSI-RSs). In Table 12, $DS_A$, $DS_B$, and DSc may refer to DS values of the receiving node A, the receiving node B, and the receiving node C, respectively, and $LR_A$, $LR_B$, and $LR_C$ may refer to LRs of the receiving node A, the receiving node B, and the receiving node C, respectively. The numbers listed in Table 12 may be regarded as written under assumption that communication environments of all antenna elements present in the respective receiving nodes are the same. However, this is merely an example for convenience of description, and the fourth exemplary embodiment of the signal transmission and reception method in the communication system is not limited thereto. For example, the fourth exemplary embodiment of the signal transmission and reception method in the communication system may be applied identically or similarly to cases when communication environments are different between the transmitting and receiving nodes, when communication environments are different between antennas within the receiving node, or the like.

The transmitting node may determine the priorities of the respective antenna combinations based on information on the respective receiving nodes and the respective antenna combinations. For example, the transmitting node may determine the priorities of the respective antenna combinations based on at least some of RSs, LRs, or reception strengths of the respective each antenna combinations.

Alternatively, the transmitting node may configure the priorities by considering factors determining the communication environment between the transmitting node and the receiving nodes, such as priorities of data to be transmitted to the receiving nodes, a total data rate for all the receiving nodes, and minimum data rates for the respective receiving nodes.

Table 12 shows a priority determination process in a situation where the number of available antennas of the transmitting node is 3 (e.g. situation shown in Table 7) and the number of available antennas of each receiving node is 1 (e.g. the situation shown in Table 11). Accordingly, the transmitting node may determine the priorities of the antenna combinations as shown in Table 13.

TABLE 13

| Combination index (6 bits) | Priority |
|---|---|
| 1 (000000) | 30 |
| ... | ... |
| 16 (001111) | 7 |
| ... | ... |
| 19 (010010) | 1 (selected) |
| ... | ... |
| 35 (100010) | 20 |

Referring to Table 13, the transmitting node may determine (or decide) priorities for the combinations based on the combinations of transmission and reception antenna elements configured as in Table 12. Based on the determined priorities, the transmitting node may finally determine transmission and reception beamforming (i.e. antenna elements to be used when transmitting signals at the transmitting node and receiving signals at each receiving node).

The operations described with reference to Tables 9 to 13 may be summarized as shown in Table 14.

TABLE 14

| Combination index (6 bits) | Transmission antenna elements (transmitting node) | Reception antenna elements (receiving node) | DS of receiving node | LR of receiving node | RSRP | Priority |
|---|---|---|---|---|---|---|
| 1 (000000) | $A_{Tx}$ #1, $A_{Tx}$ #2, $A_{Tx}$ #3 | $A_{Rx\_A}$ #4, $A_{Rx\_B}$ #5, $A_{Rx\_C}$ #2 | $DS_A$ $DS_B$ $DS_C$ | $LR_A$ $LR_B$ $LR_C$ | RSRP_69 RSRP_87 RSRP_52 | 30 |
| ... | ... | ... | ... | ... | ... | ... |
| 16 (001111) | $A_{Tx}$ #2, $A_{Tx}$ #3, $A_{Tx}$ #10 | $A_{Rx\_A}$ #4, $A_{Rx\_B}$ #5, $A_{Rx\_C}$ #2 | $DS_A$ $DS_B$ $DS_C$ | $LR_A$ $LR_B$ $LR_C$ | RSRP_75 RSRP_80 RSRP_102 | 7 |
| ... | ... | ... | ... | ... | ... | ... |
| 19 (010010) | $A_{Tx}$ #2, $A_{Tx}$ #4, $A_{Tx}$ #10 | $A_{Rx\_A}$ #4, $A_{Rx\_B}$ #5, $A_{Rx\_C}$ #2 | $DS_A$ $DS_B$ $DS_C$ | $LR_A$ $LR_B$ $LR_C$ | RSRP_95 RSRP_88 RSRP_100 | 1 (selected) |
| ... | ... | ... | ... | ... | ... | ... |
| 35 (100010) | $A_{Tx}$ #9, $A_{Tx}$ #10, $A_{Tx}$ #11 | $A_{Rx\_A}$ #4, $A_{Rx\_B}$ #5, $A_{Rx\_C}$ #2 | $DS_A$ $DS_B$ $DS_C$ | $LR_A$ $LR_B$ $LR_C$ | RSRP_69 RSRP_77 RSRP_105 | 20 |

Table 14 shows a beam/antenna element selection process when the transmitting node knows information on the antenna element combinations of the transmitting and receiving nodes, information on combination indexes, etc. In an exemplary embodiment of the communication system, the transmitting node (e.g. base station) may transmit reference signal(s) to the receiving nodes (e.g. terminals). The transmitting node may provide information on the combination indexes, indicators related to measurement and reporting of reception strength(s) of the reference signal(s), etc. to the receiving nodes. The transmitting node may transmit information on the combination indexes, indicators related to measurement and reporting of reception strength(s) of the reference signal(s), etc. before transmitting the reference signal(s), or after transmitting the reference signal(s). Alternatively, the information may be transmitted together with the reference signal(s). The receiving nodes may measure a reception strength for each antenna element combination based on the information and reference signal(s) transmitted from the transmitting node, and transmit responses (or reports) including information on the measured reception strengths to the transmitting node. The transmitting node may determine priorities for the respective antenna combinations based on the responses (or reports) from the receiving nodes. The transmitting node may transmit, to the receiving nodes, information on the determined priorities of the respective antenna combinations, or information on one or more antenna combinations selected based on the determined priorities.

Figure 10:
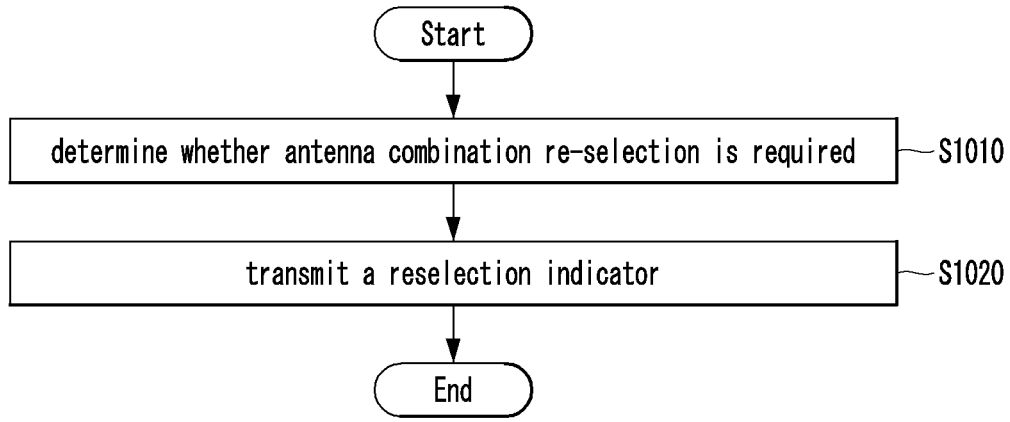
FIG. 10 is a flow chart for describing various exemplary embodiments of a signal transmission and reception method in a communication system.

FIG. 10 is a flow chart for describing a fifth exemplary embodiment of a signal transmission and reception method in a communication system.

As shown in FIG. 10, a communication system may be the same as or similar to the communication system 600 described with reference to FIG. 6. One or more communication nodes included in the communication system may include one or more antennas that are the same as or similar to the first antenna 410 described with reference to FIG. 4. According to the fifth exemplary embodiment of the signal transmission and reception method in the communication system, operations for determining whether it is required to reselect a combination of transmission and reception antenna elements in the lens MIMO scheme may be performed. Hereinafter, in describing the fifth exemplary embodiment of the signal transmission and reception method in the communication system with reference to FIG. 10, descriptions that are redundant with those described with reference to FIGS. 1 to 9 may be omitted.

In an exemplary embodiment of the communication system, a first communication node may correspond to a receiving node and a second communication node may correspond to a transmitting node. The first and second communication nodes may determine a transmission candidate antenna group and a reception candidate antenna group by using the same or similar method as described with reference to FIGS. 7 and 8. The first and second communication nodes may determine a combination (i.e. antennal element combination) of transmission antenna elements and reception antenna elements constituting the transmission candidate antenna group and the reception candidate antenna group by using the same or similar method as described with reference to FIG. 9. The first and second communication nodes may determine priorities of the determined one or more antenna element combinations by using the same or similar method as described with reference to FIG. 9. Here, the first and second communication nodes may determine whether it is required to reselect the one or more antenna element combinations configured as described above or priorities of the one or more antenna element combinations.

Specifically, the first communication node may determine whether it is required to reselect the antenna element combination(s) (S1010). The first communication node may identify transmission and reception results for the one or more currently selected antenna element combinations and compare the identified transmission and reception results with a first threshold. For example, the first communication node may measure reception strengths (e.g. RSRPs) for the one or more currently selected antenna element combinations. If a measured reception strength is greater than or equal to the first threshold, the first communication node may determine that reselection of the corresponding antenna element combination is not required. On the other hand, if the measured reception strength is less than the first threshold, the first communication node may determine that reselection of the corresponding antenna element combination is required.

The first communication node may transmit a reselection indicator based on a result of the determination of step S1010 (S1020). The first communication node may generate the reselection indicator indicating the result of the determination of step S1010. The reselection indicator may indicate whether a reselection procedure is required. In the reselection procedure, at least part of the operations described with reference to FIG. 7 (e.g. determination of the transmission candidate antenna group), operations described with reference to FIG. 8 (e.g. determination of the reception candidate antenna groups), and operations described with reference to FIG. 9 (e.g. determination of antenna element combination(s) and priorities thereof) may be performed again. When the reselection indicator indicates that the reselection procedure is required, the reselection procedure may be triggered when the first communication node transmits the reselection indicator to the second communication node. On the other hand, when the reselection indicator does not indicate that the reselection procedure is required, wireless communication may be performed based on the currently selected one or more antenna element combinations. In an exemplary embodiment of the communication system, the reselection indicator may be configured identically or similarly to Table 15.

TABLE 15

| Reselection indicator | Indication information |
|---|---|
| 1 | Reselection of antenna element combination is required |
| 0 | Reselection of antenna element combination is not required |

Table 15 is merely an example for convenience of description, and exemplary embodiments of the communication system are not limited thereto. For example, in another exemplary embodiment of the communication system, when a value of the re-sensing indicator is 0, it may mean that the reselection procedure is required, and when the value of the re-sensing indicator is 1, it may mean that the reselection procedure is not required.

The reselection indicator configured as shown in Table 15 may be transmitted through uplink control information (UCI), downlink control information (DCI), etc., and may be transmitted through RRC signaling such as UE information response and UE assistance information. Alternatively, a new RRC signaling may be defined for transmission of the reselection indicator.

Figure 11:
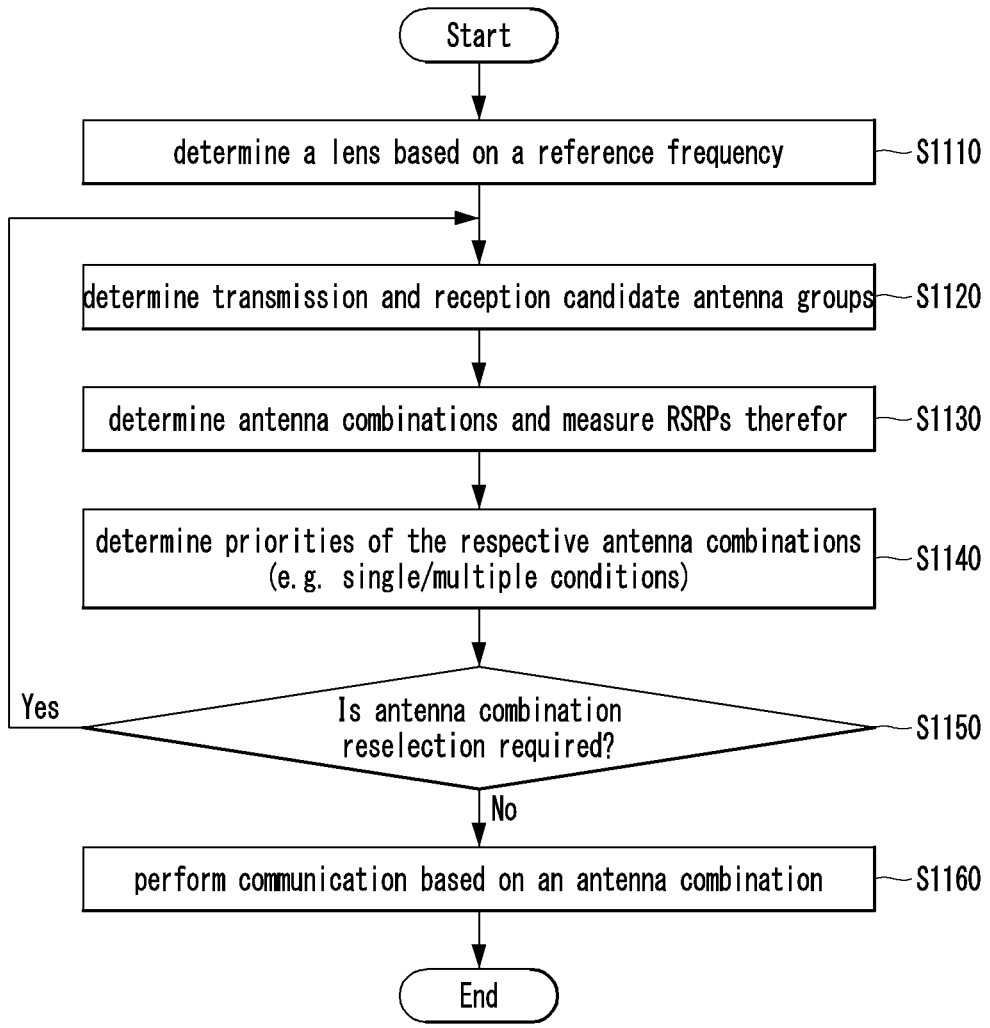
FIG. 11 is a flowchart for describing various exemplary embodiments of a signal transmission and reception method in a communication system.

FIG. 11 is a flowchart for describing a sixth exemplary embodiment of a signal transmission and reception method in a communication system.

As shown in FIG. 11, a communication system may be the same as or similar to the communication system 600 described with reference to FIG. 6. One or more communication nodes included in the communication system may include one or more antennas that are the same as or similar to the first antenna 410 described with reference to FIG. 4. According to the sixth exemplary embodiment of the signal transmission and reception method in the communication system, operations for determining transmission and reception directions in the lens MIMO scheme may be performed. Hereinafter, in describing the sixth exemplary embodiment of the signal transmission and reception method in the communication system with reference to FIG. 11, descriptions that are redundant with those described with reference to FIGS. 1 to 10 may be omitted.

In an exemplary embodiment of the communication system, a first communication node may perform an operation of determining a lens to be used for reception of a wireless signal at a first antenna configured in the lens MIMO scheme (S1110). In step S1110, the first communication node may perform operations that are the same as or similar to at least some of the operations constituting the first exemplary embodiment of the signal transmission and reception method in the communication system described with reference to FIG. 6. The first communication node may determine a lens to be used for each reference frequency or frequency band based on the first indication received from the second communication node.

In an exemplary embodiment of the communication system, the first and second communication nodes may perform operations for determining transmission and reception candidate antenna groups (S1120). The second communication node may determine the transmission candidate antenna group by using the same or similar method as described with reference to FIG. 7. The first communication node may determine the reception candidate antenna group(s) by using the same or similar method as described with reference to FIG. 8.

In an exemplary embodiment of the communication system, the first and second communication nodes may determine one or more antenna element combinations based on the transmission and reception candidate antenna groups determined in step S1120, and may measure a reception strength (e.g. RSRP) for each of the determined one or more antenna element combinations (S1130). The first and second communication nodes may perform the operations according to steps S910 to S925 described with reference to FIG. 9.

In an exemplary embodiment of the communication system, the first and second communication nodes may determine priorities for the respective antenna element combinations based on results of the measurement of step S1130 (S1140). Here, the first and second communication nodes may perform the operations according to steps S930 to S935 described with reference to FIG. 9. The operation of determining priorities may be performed based on a single condition or multiple conditions.

In an exemplary embodiment of the communication system, the first and second communication nodes may determine whether reselection of the antenna element combination(s) is required (S1150). The first communication node may determine whether reselection of the antenna element combination(s) is required by using the same or similar method as described with reference to FIG. 10, and may transmit a reselection indicator indicating a result of the determination. When it is determined that reselection of the antenna element combination(s) is required as the result of the determination of step S1150, at least part of the operations according to steps S1120 to S1140 may be performed again. On the other hand, when it is determined that reselection of the antenna element combination(s) is not required as the result of the determination of step S1150, the first and second communication nodes may perform communication with each other based on the currently selected antenna element combination(s) (S1160). For example, the second communication node may transmit a beam in the direction of the second communication node based on one or more transmission antenna elements corresponding to the currently selected antenna element combination. The first communication node may receive a beam transmitted from the second communication node based on one or more reception antenna elements corresponding to the currently selected antenna element combination.

According to the method and apparatus for transmitting and receiving signals in the communication system, MIMO-based beam transmission and reception performance for transmitting and receiving wireless signals using a large number of antennas in a high-frequency band can be improved. In the communication system, a transmitting node and a receiving node that transmit and receive wireless signals using a lens MIMO structured antenna can determine a transmission candidate antenna group and a reception candidate antenna group based on the results of mutual wireless signal transmission and reception. The transmitting node and the receiving node can determine one or more antenna element combinations based on the transmission and reception candidate antenna groups and can perform wireless communication with each other based on the determined antenna element combinations. Accordingly, the transmitting node and the receiving node can determine optimal transmission and reception directions for mutual communication.

However, the effects that the exemplary embodiments of the signal transmission and reception methods and apparatuses can achieve in the communication system are not limited to those mentioned above. Other effects not mentioned are expected to be clearly understood by those skilled in the art in the technical field to which the present disclosure belongs, based on the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner. The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An operation method of a first communication node in a communication system, the method comprising:
   determining, by a processor, a first lens to be applied to a first transmission antenna of the first communication node;
   identifying, by the processor, a first transmission direction for a second communication node of the communication system;
   determining, by the processor, a transmission candidate antenna group that includes one or more transmission antenna elements capable of transmitting a wireless signal in the first transmission direction through the first lens among a plurality of transmission antenna elements constituting the first transmission antenna;
   receiving, by the processor, information on a reception candidate antenna group from the second communication node;
   determining, by the processor, one or more antenna element combinations based on the one or more transmission antenna elements included in the transmission candidate antenna group and one or more reception antenna elements included in the reception candidate antenna group; and
   performing, by the processor, wireless communication with the second communication node based on the one or more antenna element combinations.

2. The operation method according to claim 1, wherein the one or more transmission antenna elements included in the transmission candidate antenna group are selected based on a first transmission antenna element corresponding to a first angle of departure determined based on the first transmission direction and the first lens.

3. The operation method according to claim 1, wherein the first transmission direction is identified based on location information for the first communication node, and the one or more reception antenna elements included in the reception candidate antenna group are selected based on a first reception antenna element determined based on a first reception direction for the first communication node identified at the second communication node and a first angle of incidence determined according to a second lens applied to a first reception antenna of the second communication node.

4. The operation method according to claim 1, wherein each of the one or more antenna element combinations includes at least one transmission antenna element corresponding to a number of simultaneously available transmission antenna elements of the first communication node among the one or more transmission antenna elements included in the transmission candidate antenna group, and at least one reception antenna element corresponding to a number of simultaneously available reception antenna elements of the second communication node among the one or more reception antenna elements included in the reception candidate antenna group.

5. The operation method according to claim 1, wherein the performing of the wireless communication with the second communication node includes: transmitting, to the second communication node, information on the one or more antenna element combinations, wherein the information on the one or more antenna element combinations indicates a combination index corresponding to each of the one or more antenna element combinations, and a mapping relationship between at least one transmission antenna element and at least one reception antenna element.

6. The operation method according to claim 1, wherein the performing of the wireless communication with the second communication node includes:
   transmitting, to the second communication node, information on the one or more antenna element combinations;
   performing, with the second communication node, a first measurement procedure based on the information on the one or more antenna element combinations;
   identifying a reception strength corresponding to each of the one or more antenna element combinations, based on the first measurement procedure; and
   determining a priority of each of the one or more antenna element combinations based on the reception strength corresponding to each of the one or more antenna element combinations.

7. The operation method according to claim 1, wherein the performing of the wireless communication with the second communication node includes: receiving, from the second communication node, a reselection indicator indicating whether a reselection procedure for the one or more antenna element combinations is required, wherein in response that the reselection indicator indicates that the reselection procedure is required, the reselection procedure is triggered.

8. The operation method according to claim 1, wherein the determining of the first lens includes:
   identifying information on a first reference frequency for determining a lens to be applied to the first transmission antenna; and
   determining the first lens based on the information on the first reference frequency and information on a first frequency to be used for communication with the second communication node.

9. The operation method according to claim 1, further including:
   before receiving the information on the reception candidate antenna group,
   transmitting, to the second communication node, a first indication including information on a second reference frequency for determining a lens to be applied to a first reception antenna of the second communication node; and
   transmitting first scheduling information including information on a first frequency to be used for communication with the second communication node,
   wherein the information on the second reference frequency and the information on the first frequency are used to determine a second lens to be applied to the first reception antenna in the second communication node.

10. An operation method of a first communication node in a communication system, the method comprising:
   determining, by a processor, a first lens to be applied to a first reception antenna of the first communication node;
   identifying, by the processor, a first reception direction for a second communication node of the communication system;
   determining, by the processor, a reception candidate antenna group that includes one or more reception antenna elements capable of receiving a wireless signal received at the first reception antenna in the first reception direction through the first lens among a plurality of reception antenna elements constituting the first reception antenna;

transmitting, by the processor, information on the reception candidate antenna group to the second communication node;
receiving, by the processor, from the second communication node, information on one or more antenna element combinations determined based on the one or more reception antenna elements included in the reception candidate antenna group and one or more transmission antenna elements included in a transmission candidate antenna group determined by the second communication node; and
performing, by the processor, wireless communication with the second communication node based on the one or more antenna element combinations.

11. The operation method according to claim 10, wherein the one or more transmission antenna elements included in the transmission candidate antenna group are selected based on a first transmission antenna element corresponding to a first angle of departure determined based on a first transmission direction for the first communication node identified at the second communication and a second lens to be applied to a first transmission antenna of the first communication node.

12. The operation method according to claim 10, wherein the one or more reception antenna elements included in the reception candidate antenna group are selected based on a first reception antenna element corresponding to a first angle of incidence determined based on the first reception direction and the first lens.

13. The operation method according to claim 10, wherein each of the one or more antenna element combinations includes at least one transmission antenna element corresponding to a number of simultaneously available transmission antenna elements of the second communication node among the one or more transmission antenna elements included in the transmission candidate antenna group, and at least one reception antenna element corresponding to a number of simultaneously available reception antenna elements of the first communication node among the one or more reception antenna elements included in the reception candidate antenna group.

14. The operation method according to claim 10, wherein the performing of the wireless communication with the second communication node includes:
performing, with the second communication node, a first measurement procedure based on information on the one or more antenna element combinations;
identifying a reception strength corresponding to each of the one or more antenna element combinations, based on the first measurement procedure; and
transmitting, to the second communication node, information on the reception strength corresponding to each of the one or more antenna element combinations.

15. The operation method according to claim 10, wherein the performing of the wireless communication with the second communication node includes: transmitting, to the second communication node, a reselection indicator indicating whether a reselection procedure for the one or more antenna element combinations is required, wherein in response that the reselection indicator indicates that the reselection procedure is required, the reselection procedure is triggered.

16. The operation method according to claim 15, wherein the transmitting of the reselection indicator includes:
identifying a reception strength corresponding to each of the one or more antenna element combinations;
performing determination on whether the reselection procedure is required based on the reception strength corresponding to each of the one or more antenna element combinations;
generating the reselection indicator based on a result of the determination on whether the reselection procedure is required; and
transmitting the generated reselection indicator to the second communication node.

17. A transmitting node in a communication system, comprising a processor, wherein the processor causes the transmitting node to perform:
determining a first lens to be applied to a first transmission antenna of the transmitting node;
identifying transmission directions for a plurality of receiving nodes of the communication system, respectively;
determining a transmission candidate antenna group that includes one or more transmission antenna elements capable of transmitting wireless signals in the transmission directions through the first lens among a plurality of transmission antenna elements constituting the first transmission antenna;
receiving information on reception candidate antenna groups from the plurality of receiving nodes;
determining one or more antenna element combinations based on the one or more transmission antenna elements included in the transmission candidate antenna group and one or more reception antenna elements included in the reception candidate antenna group; and
performing wireless communication with the receiving nodes based on the one or more antenna element combinations.

18. The transmitting node according to claim 17, wherein each of the one or more antenna element combinations includes at least one transmission antenna element corresponding to a number of simultaneously available transmission antenna elements of the transmitting node among the one or more transmission antenna elements included in the transmission candidate antenna group, and at least one reception antenna element corresponding to a number of simultaneously available reception antenna elements of the receiving nodes among the one or more reception antenna elements included in the reception candidate antenna group.

19. The transmitting node according to claim 17, wherein in the performing of the wireless communication with the receiving nodes, the processor further causes the transmitting node to perform:
transmitting, to the receiving nodes, information on the one or more antenna element combinations;
performing, with the receiving nodes, a first measurement procedure based on the information on the one or more antenna element combinations;
identifying reception strengths respectively corresponding to the one or more antenna element combinations, based on the first measurement procedure; and
determining respective priorities of the one or more antenna element combinations based on the reception strengths respectively corresponding to the one or more antenna element combinations.

20. The transmitting node according to claim 19, wherein in the determining of the first lens, the processor further causes the transmitting node to perform:
identifying Doppler shift (DS) information and latency requirement (LR) information for each of the receiving nodes; and determining the respective priorities of the one or more antenna element combinations based on the reception strengths respectively corresponding to the one or more antenna element combinations, the DS information for each of the receiving nodes, and the LR information for each of the receiving nodes.

\* \* \* \* \*